United States Patent
Demura

(10) Patent No.: US 8,286,418 B2
(45) Date of Patent: Oct. 16, 2012

(54) EXHAUST GAS CONTROL APPARATUS FOR INTERNAL COMBUSTION ENGINE

(75) Inventor: Takayuki Demura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 575 days.

(21) Appl. No.: 12/521,010

(22) PCT Filed: Mar. 14, 2008

(86) PCT No.: PCT/JP2008/054758
§ 371 (c)(1),
(2), (4) Date: Jun. 24, 2009

(87) PCT Pub. No.: WO2008/114730
PCT Pub. Date: Sep. 25, 2008

(65) Prior Publication Data
US 2010/0024399 A1  Feb. 4, 2010

(30) Foreign Application Priority Data
Mar. 14, 2007 (JP) .................................. 2007-064627

(51) Int. Cl.
 *F01N 3/22* (2006.01)
(52) U.S. Cl. ................ 60/285; 60/284; 60/287; 60/288; 60/300; 60/324
(58) Field of Classification Search .................... 60/280, 60/284, 285, 287, 288, 300, 324
See application file for complete search history.

(56) References Cited

U.S. PATENT DOCUMENTS

| 4,107,921 | A | * | 8/1978 | Iizuka | 60/288 |
| 4,287,716 | A | * | 9/1981 | Schuster et al. | 60/276 |
| 5,384,098 | A |   | 1/1995 | Morikawa | |
| 5,582,004 | A | * | 12/1996 | Rutschmann | 60/288 |
| 5,987,884 | A |   | 11/1999 | Kibe et al. | |
| 6,557,341 | B2 | * | 5/2003 | Bubeck et al. | 60/284 |
| 7,509,800 | B2 | * | 3/2009 | I et al. | 60/288 |
| 2001/0035009 | A1 | * | 11/2001 | Nakayasu et al. | 60/324 |
| 2002/0062642 | A1 | * | 5/2002 | Dini et al. | 60/288 |
| 2002/0194842 | A1 | * | 12/2002 | Minami | 60/288 |

(Continued)

FOREIGN PATENT DOCUMENTS

JP  59 3133  1/1984

(Continued)

*Primary Examiner* — Kenneth Bomberg
*Assistant Examiner* — Jorge Leon, Jr.
(74) *Attorney, Agent, or Firm* — Oblon, Spivak, McClelland, Maier & Neustadt, L.L.P.

(57) ABSTRACT

An exhaust gas control apparatus applied to an internal combustion engine including plural cylinders and a turbocharger, wherein an exhaust passage includes first and second branch passages. The first branch passage connects exhaust sides of cylinders #1, #4 and a turbine, and includes a starter catalyst; the second branch passage connects exhaust sides of cylinders #2, #3 and the turbine, and communicates with the first branch passage upstream of the starter catalyst. The exhaust gas control apparatus includes an exhaust gas switching valve disposed at a communication part, through which the first and second branch passages are in communication, and is switchable between an introducing position at which exhaust gas is introduced into the starter catalyst from the cylinders #2, #3 and a block position at which introduction thereof is blocked. An ECU switches the exhaust gas switching valve position based on the operating condition of the internal combustion engine.

16 Claims, 18 Drawing Sheets

U.S. PATENT DOCUMENTS

| | | | |
|---|---|---|---|
| 2006/0117742 A1* | 6/2006 | Bellinger et al. | 60/288 |
| 2007/0294999 A1* | 12/2007 | Yoshizaki et al. | 60/274 |

FOREIGN PATENT DOCUMENTS

| | | | |
|---|---|---|---|
| JP | 61 70115 | | 4/1986 |
| JP | 3 87914 | | 9/1991 |
| JP | 4 37826 | | 3/1992 |
| JP | 7 332072 | | 12/1995 |
| JP | 08121153 A | * | 5/1996 |
| JP | 10 317950 | | 12/1998 |
| JP | 11 13552 | | 1/1999 |
| JP | 2003 293750 | | 10/2003 |
| JP | 2005 171932 | | 6/2005 |

\* cited by examiner

EXHAUST GAS CONTROL APPARATUS FOR INTERNAL COMBUSTION ENGINE

TECHNICAL FIELD

The present invention relates to an exhaust gas control apparatus for an internal combustion engine, wherein the engine is provided with an exhaust gas cleaning catalyst upstream of a turbine of a turbo charger in an exhaust passage and allows part of the exhaust gas to bypass the exhaust gas cleaning catalyst and to be guided downstream.

BACKGROUND ART

An exhaust emission control apparatus for an internal combustion engine is known, in which an exhaust gas cleaning catalyst is disposed in an exhaust branch pipe upstream of an exhaust turbine of a turbo charger, and exhaust gas is diverted from the exhaust gas cleaning catalyst and is guided to the exhaust turbine in a case that the internal combustion engine is in a prescribed accelerated state (please refer to Patent document 1). Other prior technical literature relating to the present invention includes Patent documents 2, 3.

Patent document 1: JP2005-171932A
Patent document 2: JP61-070115A
Patent document 3: JP07-332072A

SUMMARY OF INVENTION

Technical Problem

By the way, it is known with regard to a turbo charger provided to an internal combustion engine having plural cylinders that turbocharging performance can be improved by separately introducing exhaust gas from part of cylinders and exhaust gas from the remaining part of cylinders into a same turbine and making use of exhaust pulsation thereof. In the internal combustion engine of the patent document 1, exhaust gas emitted from each cylinder is introduced into a turbine through a same exhaust branch pipe, and thus there is still room for improving turbocharging performance. Furthermore, in the exhaust emission control apparatus of the patent document 1, almost all amounts of exhaust gas emitted from the internal combustion engine are guided to the turbine without passing through a gas cleaning catalyst in the case that exhaust gas is diverted from the exhaust gas cleaning catalyst and is guided to the turbine. Therefore, an exhaust emission control apparatus having high cleaning performance needs to be disposed downstream of the turbine in order to prevent degradation of exhaust emission even in the case that exhaust gas is diverted from the exhaust gas cleaning catalyst.

In this circumstance, it is an object of the present invention to provide an exhaust gas control apparatus for an internal combustion engine, which can clean exhaust gas guided to a turbine and improve turbocharging performance.

Solution to Problem

An exhaust gas control apparatus for an internal combustion engine of the present invention is applied to an internal combustion engine having a plurality of cylinders and a turbo charger, wherein an exhaust passage of the internal combustion engine includes a first branch passage and a second branch passage, the first branch passage connects exhaust sides of cylinders of a first cylinder group composed of part of the plurality of cylinders and a turbine of the turbo charger, and is provided with an exhaust gas cleaning catalyst; and the second branch passage connects exhaust sides of cylinders of a second cylinder group composed of the remaining part of the plurality of cylinders and the turbine, and is in communication with the first branch passage upstream of the exhaust gas cleaning catalyst, and the exhaust gas control apparatus includes a valve switch device which is disposed at a communication part, through which the first branch passage and the second branch passage are in communication, and is switchable between an introducing position at which exhaust gas is introduced into the exhaust gas cleaning catalyst from cylinders of the second cylinder group and a block position at which introduction thereof is blocked; and a valve control device which switches a position of the valve switch device on a basis of an operating condition of the internal combustion engine.

According to the exhaust gas control apparatus of the present invention, exhaust gas emitted from cylinders of the first cylinder group can be guided to the turbine through the first branch passage, and exhaust gas emitted from cylinders of the second cylinder group can be guided to the turbine through the second branch passage, respectively, by switching the valve switch device to the block position. And thus, turbocharging performance of the internal combustion engine can be improved by making use of exhaust pulsation. Furthermore, according to the exhaust gas control apparatus of the present invention, in a case that the valve switch device is switched to the introducing position, exhaust gas emitted from cylinders of the first cylinder group and cylinders of the second cylinder group can be guided to the exhaust gas cleaning catalyst, respectively; and exhaust gas emitted from cylinders of the first cylinder group can be guided to the exhaust gas cleaning catalyst even in a case that the valve switch device is switched to the block position. Namely, exhaust gas emitted from cylinders of the first cylinder group passes through the exhaust gas cleaning catalyst, and then is guided to the turbine. Accordingly, exhaust gas guided to the turbine can be cleaned and turbocharging performance can be improved.

In an aspect of the exhaust gas control apparatus of the present invention, the internal combustion engine is a spark ignition internal combustion engine, and the exhaust gas control apparatus may include an ignition timing control device which retards an ignition timing for cylinders of the second cylinder group more than an ignition timing for cylinders of the first cylinder group in a case that the valve switch device is switched to the block position. When the valve switch device is switched to the block position, the back-pressure exerting on a cylinder of the second cylinder group becomes lower than back-pressure exerting on a cylinder of the first cylinder group, and thus volumetric efficiency in a cylinder of the second cylinder group becomes higher than that in the cylinder of the first cylinder group. As well known, the higher the volumetric efficiency cylinder has, the higher the torque in the cylinder becomes. In this aspect, when the valve switch device is at the block position, the ignition timing for a cylinder of the second cylinder group is retarded, And thus, torque in a cylinder of the second cylinder group can be reduced. Accordingly, fluctuation in torque in each cylinder of the internal combustion engine can be suppressed.

In an aspect of the exhaust gas control apparatus of the present invention, it may further include an air-fuel ratio detecting device which is disposed between the communication part and the exhaust gas cleaning catalyst in the first branch passage, and detects the air-fuel ratio of exhaust gas; and a feedback correcting device which sets amount of feedback correction in accordance with a difference between the air-fuel ratio detected by the air-fuel ratio detecting device and a target air-fuel ratio, and corrects the amount of fuel to be supplied to each cylinder respectively in a feedback manner in accordance with the set the amount of feedback correction, wherein in a case that the feedback correcting device corrects the amount of fuel to be supplied to each cylinder in a feedback manner, the valve control device may switch the valve switch device to the introducing position. In a case of executing a feedback correction for the amount of fuel in this manner through the air-fuel ratio of exhaust gas, exhaust gas emitted from cylinders of the second cylinder group can be guided to the air-fuel ratio detecting device by switching the valve switch device to the introducing position. And thus, feedback correction for each cylinder can be executed properly.

In an aspect of the exhaust gas control apparatus of the present invention, it may further include an air-fuel ratio detecting device which is disposed between the communication part and the exhaust gas cleaning catalyst in the first branch passage, and detects the air-fuel ratio of the exhaust gas; and a feedback correcting device which sets the amount of feedback correction in accordance with a difference between the air-fuel ratio detected by the air-fuel ratio detecting device and a target air-fuel ratio, and corrects the amount of fuel to be supplied to each cylinder respectively in a feedback manner in accordance with the set amount of feedback correction, wherein in a case that the valve switch device is switched to the block position, the feedback correcting device sets the amount of feedback correction on a basis of the air-fuel ratio of the exhaust gas emitted from cylinders of the first cylinder group, and corrects the amount of fuel supplied to cylinders of the second cylinder group in accordance with the set amount of feedback correction in a feedback manner. When the valve switch device is at the block position, exhaust gas emitted from cylinders of the second cylinder group is diverted from the air-fuel ratio detecting device and is guided to the turbine. And thus, the air-fuel ratio of the exhaust gas cannot be detected by the air-fuel ratio detecting device. Therefore, the amount of feedback correction is set on the basis of the air-fuel ratio of the exhaust gas emitted from cylinders of the first cylinder group, wherein their air-fuel ratio is detectable by the air-fuel ratio detecting device, and the amount of fuel supplied to cylinders of the second cylinder group is corrected in a feedback manner in accordance with the amount of feedback correction. By correcting the amount of fuel supplied to cylinders of the second cylinder group in this feedback manner, the amounts of fuel in cylinders of the second cylinder group can be corrected in a feedback manner even when the valve switch device is at the block position, without increasing the number of air-fuel ratio detecting devices.

In an aspect of the exhaust gas control apparatus of the present invention, the valve control device may switch the valve switch device to the block position during acceleration of the internal combustion engine. As described above, by switching the valve switch device to the block position, exhaust pulsation can be suppressed, thereby improving turbocharging performance. Furthermore, since exhaust gas emitted from cylinders of the second cylinder group can be guided directly to the turbine, exhaust gas emitted from cylinders of the second cylinder group can be guided to the turbine without reducing exhaust energy of exhaust gas. Accordingly, turbocharging performance can be further improved. Thus, acceleration performance of the internal combustion engine can be improved.

In an aspect of the exhaust gas control apparatus of the present invention, it may further include a rear-stage exhaust gas cleaning catalyst which is disposed downstream of the turbine in the exhaust passage, and exhibits cleaning performance in a prescribed active temperature zone, wherein the valve control device switches the valve switch device to the introducing position, when a temperature of the rear-stage exhaust gas cleaning catalyst is lower than a prescribed temperature, which is a lower limit of the prescribed active temperature zone, or when a temperature of cooling water of the internal combustion engine is lower than a prescribed water temperature set in view of the lower limit of the prescribed active temperature zone. By switching the valve switch device to the introducing position, exhaust gas emitted from each cylinder of the first cylinder group and the second cylinder group can be cleaned in both the exhaust gas cleaning catalyst and the rear-stage exhaust gas cleaning catalyst, respectively. In this aspect, when temperature of the rear-stage exhaust gas cleaning catalyst is lower than the prescribed temperature, in other words, when the rear-stage exhaust gas cleaning catalyst does not exhibit enough cleaning performance, the exhaust gas control apparatus may switch the valve switch device to the introducing position. And thus, degradation of exhaust emission can be suppressed. Since the rear-stage exhaust gas cleaning catalyst is heated up by the exhaust gas, it can be considered that the rear-stage exhaust gas cleaning catalyst is also at a low temperature when the internal combustion engine is at a low temperature, namely, when cooling water is at a low temperature. The temperature of the rear-stage exhaust gas cleaning catalyst can be estimated in this manner from the temperature of cooling water. And thus, degradation of exhaust emission can be suppressed by setting the prescribed water temperature properly and then by switching the valve switch device to the introducing position in a case that the rear-stage exhaust gas cleaning catalyst does not exhibit enough cleaning performance.

In an aspect of the exhaust gas control apparatus of the present invention, it may further include an air-fuel ratio control device which is capable of changing air-fuel ratios in the plurality of cylinders respectively, and which changes the air-fuel ratio in each cylinder of the internal combustion engine respectively to a leaner side than a theoretical air-fuel ratio when a prescribed lean operating condition is fulfilled, wherein in a case that the prescribed lean operating condition is fulfilled, the valve control device may switch the valve switch device to the introducing position. In this case, exhaust gas emitted from cylinders of the first cylinder group and the second cylinder group can be cleaned respectively in the exhaust gas cleaning catalyst.

In this aspect, the exhaust gas control apparatus may further include a NOx storage reduction type catalyst disposed downstream of the turbine in the exhaust passage, wherein in a case that an S-poisoning restore treatment is executed, where the NOx catalyst is heated up to a target temperature zone such that sulfur oxide is released from the NOx catalyst, the valve control device switches the valve switch device to the block position; and the air-fuel ratio control device may change air-fuel ratios in cylinders of the first cylinder group to a leaner side than a theoretical air-fuel ratio, and may change the air-fuel ratios in cylinders of the second cylinder group to a richer side than a theoretical air-fuel ratio. In this case, unburned fuel contained in the exhaust gas emitted from cylinders of the second cylinder group is guided to the NOx catalyst without being consumed in the exhaust gas cleaning catalyst. And thus, the NOx catalyst can be heated up promptly. Moreover, only exhaust gas having a leaner air-fuel ratio than the theoretical air-fuel ratio flows in the exhaust gas cleaning catalyst, and thus, useless increase of temperature of the exhaust gas cleaning catalyst can be prevented. Furthermore, by guiding exhaust gas having a leaner air-fuel ratio than the theoretical air-fuel ratio to the exhaust gas cleaning catalyst, poisoning of exhaust gas cleaning catalyst by hydrocarbon (HC) and carbon monoxide (CO) can be suppressed.

Moreover, the exhaust gas control apparatus may further include a NOx storage reduction type catalyst which is disposed downstream of the turbine in the exhaust passage, wherein the air-fuel ratio control device executes a rich spike treatment, where air-fuel ratios in the plurality of cylinders are changed to a richer side than a theoretical air-fuel ratio, in order that nitric oxide stored in the NOx catalyst should be reduced by changing the air-fuel ratio of the exhaust gas in the NOx catalyst to a richer side than a theoretical air-fuel ratio, in a case that the rich spike treatment is in operation, the valve control device may switch the valve switch device to the block position. By changing the valve switch device to the block position in this manner, exhaust gas emitted from cylinders of the second cylinder group can be diverted from the exhaust gas cleaning catalyst and be guided to the NOx catalyst. And thus, it can be prevented that unburned fuel contained in the exhaust gas is consumed in the exhaust gas cleaning catalyst. Accordingly, Nitric oxide (NOx) stored in the NOx catalyst can be reduced promptly. Furthermore, the amount of fuel consumed during the rich spike treatment can be reduced, and thus fuel consumption can be improved.

In an aspect of the exhaust gas control apparatus including an air-fuel ratio control device, it may further include a rear-stage exhaust gas cleaning catalyst which is disposed downstream of the turbine in the exhaust passage, and exhibits cleaning performance in a prescribed active temperature zone, wherein when a temperature of the rear-stage exhaust gas cleaning catalyst is at or lower than a lower limit of the prescribed active temperature zone, the valve control device switches the valve switch device to the block position and prohibits a lean control, where the air-fuel ratio control device changes air-fuel ratios in the plurality of cylinders to a leaner side than the theoretical air-fuel ratio, and when the temperature of the rear-stage exhaust gas cleaning catalyst is higher than the lower limit of the prescribed active temperature zone, the valve control device may switch the valve switch device to the introducing position, and may allow the lean control executed by the air-fuel ratio control device. By switching the valve switch device to the block position, exhaust gas emitted from cylinders of the second cylinder group can be guided to the rear-stage exhaust gas cleaning catalyst without being cleaned in the exhaust gas cleaning catalyst. Furthermore, the lean control is prohibited at this time, and thus HC, CO, and the like are contained in the exhaust gas emitted from cylinders of the second cylinder group. By guiding unclean exhaust gas and guiding the exhaust gas emitted from cylinders of the first cylinder group and then cleaned in the exhaust gas cleaning catalyst, to the rear-stage exhaust gas cleaning catalyst in this manner, HC and CO contained in unclean exhaust can be oxidized in the rear-stage exhaust gas cleaning catalyst, and the rear-stage exhaust gas cleaning catalyst can be heated up promptly to a prescribed active temperature zone. Therefore, degradation of exhaust emission can be suppressed.

In an aspect, in a case of changing the air-fuel ratio in each cylinder of the internal combustion engine, the air-fuel ratio control device may set a time difference between a change timing of air-fuel ratios in cylinders of the first cylinder group and a change timing of air-fuel ratios in cylinders of the second cylinder group in view of a difference between a time taken for exhaust gas emitted from cylinders of the first cylinder group to arrive at the communication part and a time taken for exhaust gas emitted from cylinders of the second cylinder group to arrive at the communication part and an operating time of the valve switch device, respectively. In this case, by setting a proper length of the time difference, a mixed state of exhaust gas having a leaner air-fuel ratio than the theoretical air-fuel ratio and exhaust gas having the theoretical air-fuel ratio in the exhaust gas cleaning catalyst can be prevented. Therefore, an increase of the temperature of the exhaust gas cleaning catalyst can be suppressed, and thus degradation of the exhaust gas cleaning catalyst due to heat can be prevented. Furthermore, in a case that a three way catalyst is disposed as an exhaust gas cleaning catalyst, NOx can be cleaned properly in the three way catalyst, and thus degradation of exhaust emission can be suppressed.

Furthermore, in a case that the air-fuel ratio in each cylinder of the internal combustion engine is changed from a leaner air-fuel ratio than a theoretical air-fuel ratio to a theoretical air-fuel ratio, the valve control device may switch the valve switch device to the block position, and in a case that the air-fuel ratio in each cylinder of the internal combustion engine is to be changed from a leaner air-fuel ratio than a theoretical air-fuel ratio to a theoretical air-fuel ratio, the air-fuel ratio control device may retard the change timing of air-fuel ratios in cylinders of the second cylinder group later than the change timing of air-fuel ratios in cylinders of the first cylinder group. When the valve switch device is at the block position, exhaust gas emitted from cylinders of the first cylinder group passes through the exhaust gas cleaning catalyst. On the other hand, exhaust gas emitted from cylinders of the second cylinder group does not pass through the exhaust gas cleaning catalyst, and thus exhaust gas emitted from cylinders of the second cylinder group arrives fast at the rear-stage exhaust gas cleaning catalyst. In this aspect, the change timing for the air-fuel ratio of cylinders of the second cylinder group is retarded at the time of changing the air-fuel ratio when the valve switch device is switched to the block position. And thus, the time when exhaust gas emitted from cylinders of the first cylinder group arrives at the rear-stage exhaust gas cleaning catalyst after the change of the air-fuel ratio can be aligned with the time when exhaust gas emitted from cylinders of the second cylinder group arrives at the rear-stage exhaust gas cleaning catalyst after the change of the air-fuel ratio. Accordingly, a mixed state of exhaust gas having a leaner air-fuel ratio than the theoretical air-fuel ratio and exhaust gas having the theoretical air-fuel ratio in the rear-stage exhaust gas cleaning catalyst can be prevented. Furthermore, in a case that a NOx storage reduction type catalyst is disposed as a rear-stage exhaust gas cleaning catalyst, NOx can be cleaned properly in this NOx catalyst, and thus degradation of exhaust emission can be suppressed.

In an aspect of the exhaust gas control apparatus of the present invention, it may further include a catalyst temperature acquiring device which acquires a temperature of the exhaust gas cleaning catalyst, wherein in a case that a temperature acquired by the catalyst temperature acquiring device is at or higher than a prescribed overheat judgment temperature, the valve control device may switch the valve switch device to the block position, wherein the prescribed overheat judgment temperature is set in view of a temperature beyond which the exhaust gas cleaning catalyst gets degraded. By switching the valve switch device to the block position in this manner, inflow of exhaust gas emitted from cylinders of the second cylinder group in the exhaust gas cleaning catalyst can be prevented. Accordingly, the temperature of the exhaust gas cleaning catalyst can be reduced, and the increase of the temperature can be suppressed. And thus, overheat of the exhaust gas cleaning catalyst can be prevented.

In an aspect, the exhaust gas control apparatus may further include a catalyst temperature increase suppressing device, which changes air-fuel ratios in cylinders of the first cylinder group to a richer side than a theoretical air-fuel ratio and changes air-fuel ratios in cylinders of the second cylinder group to a theoretical air-fuel ratio, in a case that the valve switch device is at the block position and that a temperature acquired by the catalyst temperature acquiring device is at or higher than the prescribed overheat judgment temperature. The temperature of exhaust gas emitted from cylinders of the first cylinder group can be reduced in this manner by changing the air-fuel ratio of cylinders of the first cylinder group to a richer side than the theoretical air-fuel ratio. And thus, the temperature of the exhaust gas cleaning catalyst can be reduced, and the increase of the temperature can be suppressed. Accordingly, overheat of the exhaust gas cleaning catalyst can be prevented.

In an aspect of the exhaust gas control apparatus including a catalyst temperature acquiring device, it may further include an air-fuel ratio changing-to-richer-side device, which changes air-fuel ratios in cylinders of the first cylinder group to a first air-fuel ratio on a richer side than a theoretical air-fuel ratio and changes air-fuel ratios in cylinders of the second cylinder group to a second air-fuel ratio which is on a richer side than a theoretical air-fuel ratio and on a leaner side than the first air-fuel ratio, in a case that the valve switch device is at the block position and that a temperature of exhaust gas emitted from each cylinder of the internal combustion engine is higher than the prescribed overheat judgment temperature and is at or higher than a prescribed allowable upper limit temperature, which is set in view of heat resistance of exhaust components disposed in the exhaust passage of the internal combustion engine. In this case, by reducing the temperature of the exhaust gas emitted from cylinders of the first cylinder group, the temperature of the exhaust gas cleaning catalyst can be reduced and the increase of the temperature can be suppressed. Thus, overheat of the exhaust gas cleaning catalyst can be prevented. Furthermore, the temperature of the exhaust gas emitted from cylinders of the second cylinder group can be reduced, and thus fire damage of exhaust components due to exhaust heat can be prevented.

In an aspect of the exhaust gas control apparatus of the present invention, it may further include a fuel supply stop device which stops fuel supply to cylinders of any one of the first cylinder group and the second cylinder group, in a case that a prescribed fuel stop condition is fulfilled, wherein in a case that fuel supply to any cylinder of the plurality of cylinders is stopped by the fuel supply stop device, the valve control device may switch the valve switch device to the block position. When fuel supply is stopped, air is emitted from each cylinder. And thus, the amount of oxygen flowing in the exhaust gas cleaning catalyst can be reduced by switching the valve switch device to the block position in this manner. Accordingly, degradation of the exhaust gas cleaning catalyst can be suppressed.

In this aspect, in a case that a prescribed fuel stop condition is fulfilled, the fuel supply stop device stops fuel supply to cylinders of the second cylinder group, and the exhaust gas control apparatus may further include an in-fuel-stop air-fuel ratio change device which changes air-fuel ratios in cylinders of the first cylinder group to a theoretical air-fuel ratio or an air-fuel ratio on a richer side than a theoretical air-fuel ratio, in a case that the prescribed fuel stop condition is fulfilled. In this case, the air-fuel ratio of the exhaust gas emitted from cylinders of the first cylinder group can be controlled at or on a richer side than the theoretical air-fuel ratio. And thus, the amount of oxygen flowing in the exhaust gas cleaning catalyst can be further reduced, and degradation of the exhaust gas cleaning catalyst can be further suppressed. Furthermore, fuel supply to cylinders of the second cylinder group is stopped, and thus fuel consumption can be improved.

Furthermore, the fuel supply stop device may include a number-of-supply-stopped-cylinders change device, which stops fuel supply to cylinders of the second cylinder group, and changes air-fuel ratios in cylinders of the first cylinder group to a theoretical air-fuel ratio or an air-fuel ratio on a richer side than a theoretical air-fuel ratio, in a case that the prescribed fuel stop condition is fulfilled and a temperature of the exhaust gas cleaning catalyst is at or higher than a prescribed degradation suppress judgment temperature set in view of a temperature beyond which the exhaust gas cleaning catalyst gets degraded, and stops fuel supply to the plurality of cylinders respectively in a case that the prescribed fuel stop condition is fulfilled and a temperature of the exhaust gas cleaning catalyst is lower than the prescribed degradation suppress judgment temperature. The higher the oxygen concentration in the exhaust gas cleaning catalyst and the more amount of oxygen, the more accelerated the degradation. On the other hand, when the temperature of the exhaust gas cleaning catalyst is low enough, it is hardly degraded even with plenty of oxygen. Therefore, in this case, fuel supply to all cylinders can be stopped. In this aspect, by setting the prescribed degradation suppress judgment temperature properly, degradation of the exhaust gas cleaning catalyst can be suppressed, and fuel consumption can be further improved.

DESCRIPTION OF EMBODIMENTS

First Embodiment

Figure 1:
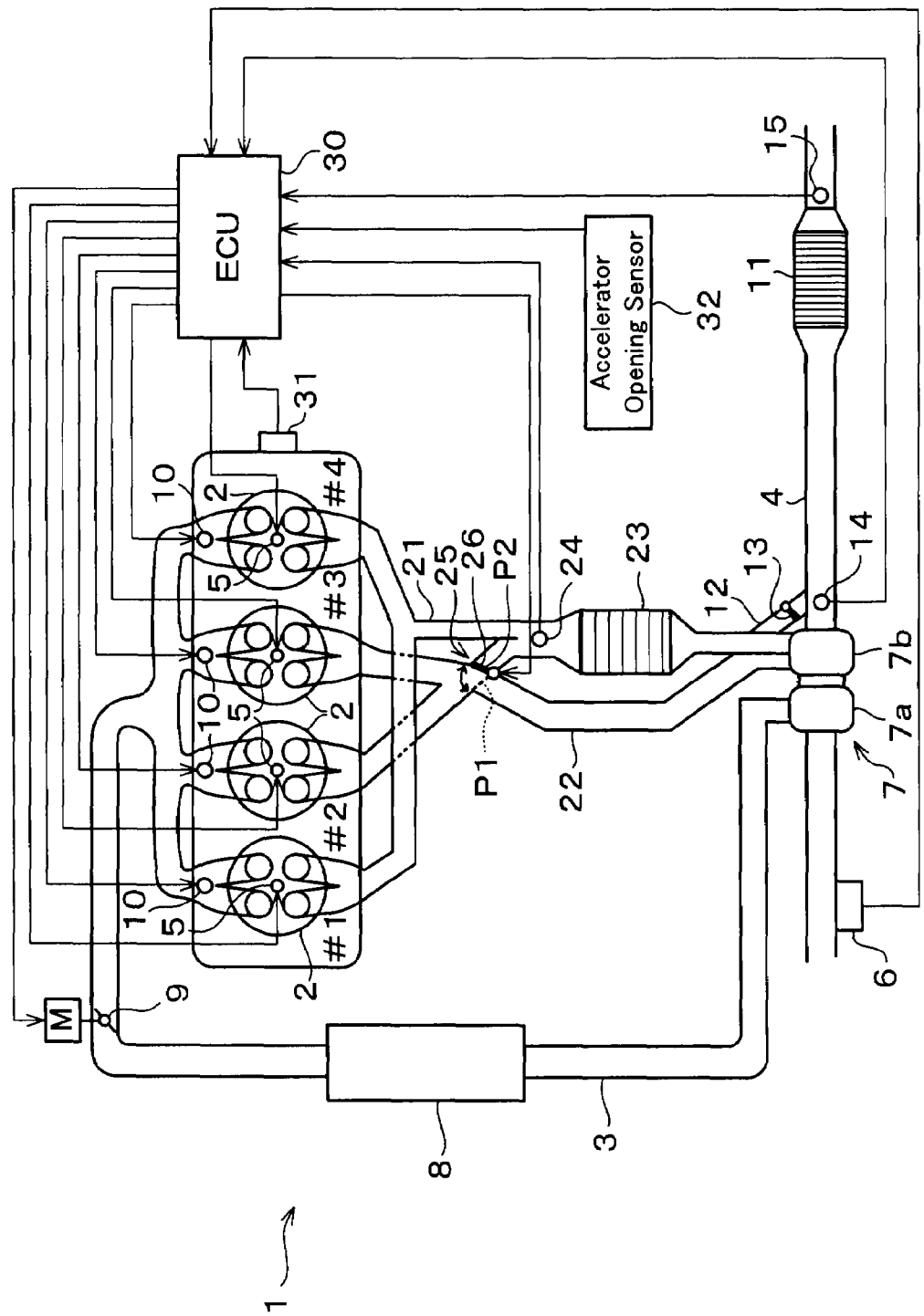
FIG. 1 is a view showing an internal combustion engine in which an exhaust gas control apparatus according to a first embodiment of the present invention is incorporated.

FIG. 1 shows an internal combustion engine in which an exhaust gas control apparatus according to a first embodiment of the present invention is incorporated. The internal combustion engine 1 of FIG. 1 (it may be referred to as an engine in the following.) includes four cylinders 2, an intake passage 3, and an exhaust passage 4, and each passage is connected to each cylinder. Additionally, each cylinder is distinguished from each other by numbering with a cylinder number of #1-#4 from one end to the other end of their aligned direction. Each cylinder 2 is provided with an ignition plug 5 for igniting a mixed fuel gas in the cylinder 2. Namely, the engine 1 is a spark ignition internal combustion engine. The intake passage 3 is provided with an airflow meter 6 which outputs a signal corresponding to an amount of intake gas; a compressor 7a of a turbo charger 7; an intercooler 8 which cools intake gas; a throttle valve 9 for regulating the amount of intake gas; and four injectors 10 which inject fuel into the intake passage 3. As shown in FIG. 1, each injector 10 is disposed corresponding to the cylinder 2 (#1-#4) at a branch portion of the intake passage 3. The intake passage 3 is branched in order that the intake passage 3 should be connected to an intake side of each cylinder 2. Accordingly, the amount of fuel supplied to each cylinder 2 (#1-#4) can be controlled separately. Thus, the air-fuel ratio in each cylinder 2 (#1-#4) can be controlled separately in the engine 1.

The exhaust passage 4 is provided with a turbine 7b of the turbo charger 7 and a main catalyst 11 disposed downstream of the turbine 7b and serving as a rear-stage exhaust gas cleaning catalyst. As the main catalyst 11, a three way catalyst is disposed. The exhaust passage 4 is also provided with a bypass passage 12 for diverting exhaust gas from the turbine 7b to be guided downstream. The bypass passage 12 is provided with a boost pressure regulating valve 13 which is opened when a boost pressure in the engine 1 reaches a preset upper limit boost pressure. As shown in FIG. 1, a second air-fuel ratio sensor 14 for detecting air-fuel ratio of exhaust gas is disposed between the turbine 7b and the main catalyst 11 in the exhaust passage 4, and an O2 sensor 15 which outputs a signal corresponding to the oxygen concentration of the exhaust gas is disposed downstream of the main catalyst 11 in the exhaust passage 4, respectively. The second air-fuel ratio sensor 14 may be the same type as a well known sensor that is generally attached to an internal combustion engine. The O2 sensor 15 may also be a well known one having an output characteristic where about 1 (V) is outputted for an air-fuel ratio on a richer side than the theoretical air-fuel ratio and about 0 (V) is outputted on a leaner side thereof, respectively. Therefore, their detailed description will be omitted.

Figure 2:
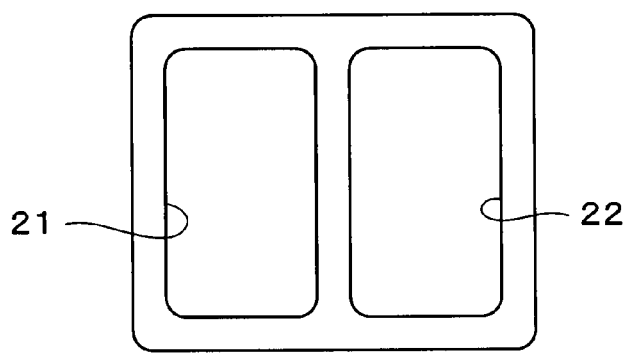
FIG. 2 is a view showing an inlet portion of a turbine of a turbo charger viewed from a flow-in direction of exhaust gas.

As shown in FIG. 1, the exhaust passage 4 includes a first branch passage 21 which connects exhaust sides of the cylinders 2 (#1, #4) and the turbine 7b; and a second branch passage 22 which connects exhaust sides of the cylinders 2 (#2, #3) and the turbine 7b. FIG. 2 is a view showing an inlet portion of the turbine 7b viewed from a flow-in direction of exhaust gas. As shown in FIG. 2, the first branch passage 21 and the second branch passage 22 are individually connected to the inlet portion of the turbine 7b. The first branch passage 21 is provided with a starter catalyst 23 having a smaller volume than the main catalyst 11 and serving as an exhaust gas cleaning catalyst and a first air-fuel ratio sensor 24 disposed upstream of the starter catalyst 23, detecting the air-fuel ratio of the exhaust gas, and serving as an air-fuel ratio detecting device. As a starter catalyst 23, a three way catalyst is disposed. The second branch passage 22 is in communication with the first branch passage 21 at a communication part 25 upstream of the starter catalyst 23. The communication part 25 is provided with an exhaust gas switching valve 26. The exhaust gas switching valve 26 can be switched between an introducing position P1 (please refer to FIG. 1) at which exhaust gas emitted from each cylinder 2 (#2, #3) is introduced into the starter catalyst 23, and a block position P2 (please refer to FIG. 1) at which introduction of the exhaust gas is blocked, and serves as a valve switch device. Additionally, each branch passage 21, 22 is connected to each cylinder 2 in this manner. And thus, the cylinder 2 (#1, #4) correspond to the first cylinder group of the present invention, and the cylinder 2 (#2, #3) correspond to the second cylinder group of the present invention.

The operation of the exhaust gas switching valve 26 is controlled by an engine control unit (ECU) 30. ECU 30 is a well-known computer unit which is configured as a computer including a microprocessor and peripheral devices required to their operation, such as RAM, ROM, and the like and which controls the operation of the ignition plug 5, the injector 10, and the like on the basis of output signals of various sensors provided to the engine 1 thereby controlling the operating condition of the engine 1. For example, ECU 30 calculates an amount of fuel to be injected from each injector 10 in accordance with the operating condition of the engine 1, and controls the operation of each injector 10 such that the calculated amount of fuel is injected. As sensors referred in executing the above control, ECU 30 is connected to an airflow meter 6, a first air-fuel ratio sensor 24, a second air-fuel ratio sensor 14, an O2 sensor 15, a crank angle sensor 31 which outputs a signal corresponding to a crank angle of the engine 1, and an accelerator opening sensor 32 which outputs a signal corresponding to an opening of the accelerator.

Figure 3:
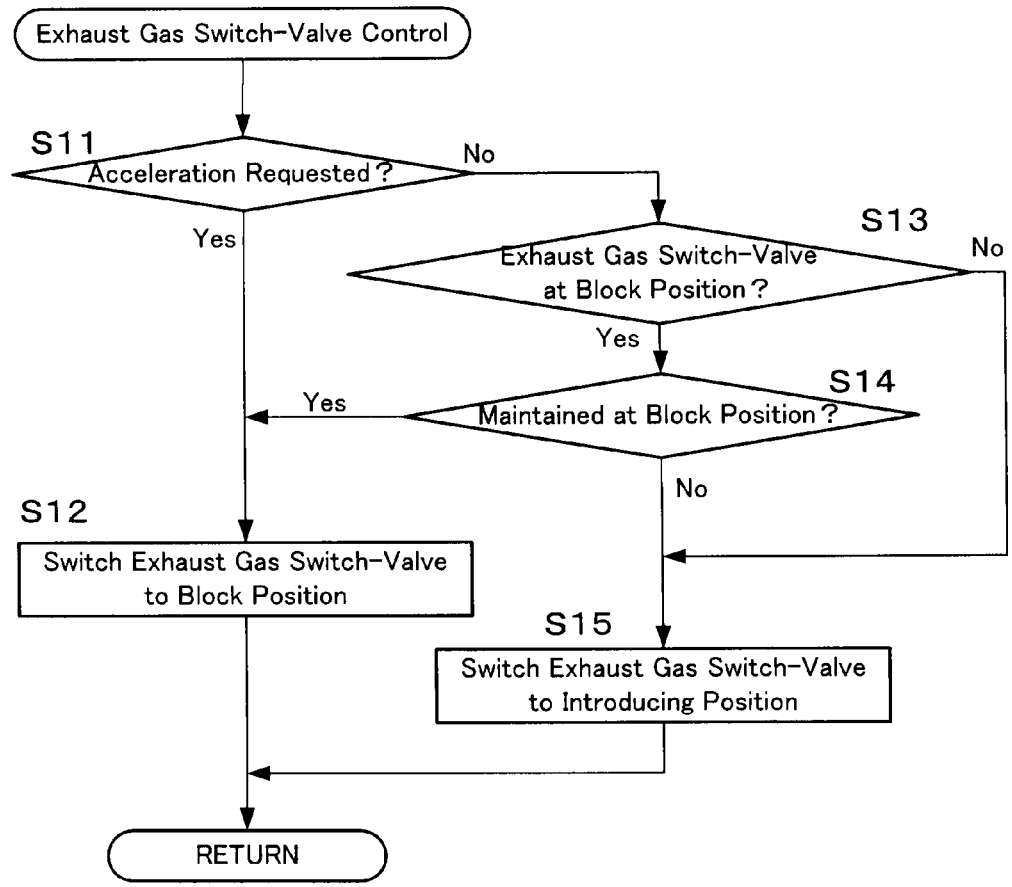
FIG. 3 is a flowchart showing an exhaust gas switching valve control routine executed by the ECU.

In the engine 1, by switching the position of the exhaust gas switching valve 26 in accordance with the operating condition of the engine 1, acceleration performance of the engine 1 can be improved, and the temperatures of the starter catalyst 23 and the main catalyst 11 can be regulated. FIG. 3 shows an exhaust gas switching valve control routine executed by ECU 30 repeatedly in a prescribed period during operation of the engine 1 in order that acceleration performance of the engine 1 should be improved. In this manner, ECU 30 functions as a valve control device of the present invention.

In the control routine of FIG. 3, ECU 30 determines whether or not acceleration is requested to the engine 1 at step S11. Existence of an acceleration request is judged, for example, with reference to an output signal of the accelerator opening sensor 32. When a change in an opening of accelerator per unit time ΔTA (it may be referred as a rate of change in accelerator opening in the following.) is equal to or larger than a preset threshold α, ECU 30 determines that acceleration is requested. When ECU 30 determines that the acceleration request is made, the process advances to step S12, and ECU 30 switches the exhaust gas switching valve 26 to the block position P2. Additionally, in a case that the exhaust gas switching valve 26 has been already switched to the block position P2, ECU 30 maintains the condition. Thereafter, ECU 30 ends the current control routine.

On the other hand, when ECU 30 determines that no acceleration request is made, the process advances to step S13, and ECU 30 determines whether or not the exhaust gas switching valve 26 is at the block position P2. When ECU 30 determines that the exhaust gas switching valve 26 is at the introducing position P1, ECU 30 skips step S14, and the process advances to step S15. On the other hand, when ECU 30 determines that the exhaust gas switching valve 26 is at the block position P2, the process advances to step S14, and ECU 30 determines whether or not the position of the exhaust gas switching valve 26 is maintained at the block position P2. It is determined whether or not the exhaust gas switching valve 26 is maintained at the block position P2, for example, on the basis of an elapsed time from the request of acceleration made to the engine 1 or on the basis of the opening of accelerator. For example, when the elapsed time from the acceleration request made to the engine 1 is within a preset prescribed time, ECU 30 determines that the switch valve 26 is maintained at the block position P2. Furthermore, for example, when a rate of change in accelerator opening ΔTA is equal to or larger than a preset threshold 1, ECU 30 determines that the switch valve 26 is maintained at the block position P2. The threshold β is a value set as a measure for determining whether or not the exhaust gas switching valve 26 is to be maintained at the block position P2, and is set to a lesser value than the threshold α. When ECU 30 determines that the exhaust gas switching valve 26 is to be maintained at the block position P2, the process advances to step S12, and ECU 30 ends the current control routine and after that the exhaust gas switching valve 26 is maintained at the block position P2. On the other hand, when ECU 30 determines that the exhaust gas switching valve 26 is to be switched to the introducing position P1, the process advances to step S15, and ECU 30 switches the exhaust gas switching valve 26 to the introducing position P1. Additionally, in a case that the exhaust gas switching valve 26 has been already switched to the introducing position P1, ECU 30 maintains the condition. Thereafter, ECU 30 ends the current control routine.

When an acceleration request is made to the engine 1 in this manner, exhaust gas can be introduce into the turbine 7b respectively from both the first branch passage 21 and the second branch passage 22 by switching the exhaust gas switching valve 26 to the block position P2. In this case, turbocharging performance can be improved by making use of exhaust pulsation, and thus acceleration performance of the engine 1 can be improved. On the other hand, when no acceleration request is made to the engine 1, ECU 30 switches the exhaust gas switching valve 26 to the introducing position P1, and thus exhaust gas emitted from each cylinder 2 of the engine 1 can be cleaned in the starter catalyst 23 and the main catalyst 11. Accordingly, quality of exhaust emission can be improved.

Figure 4:
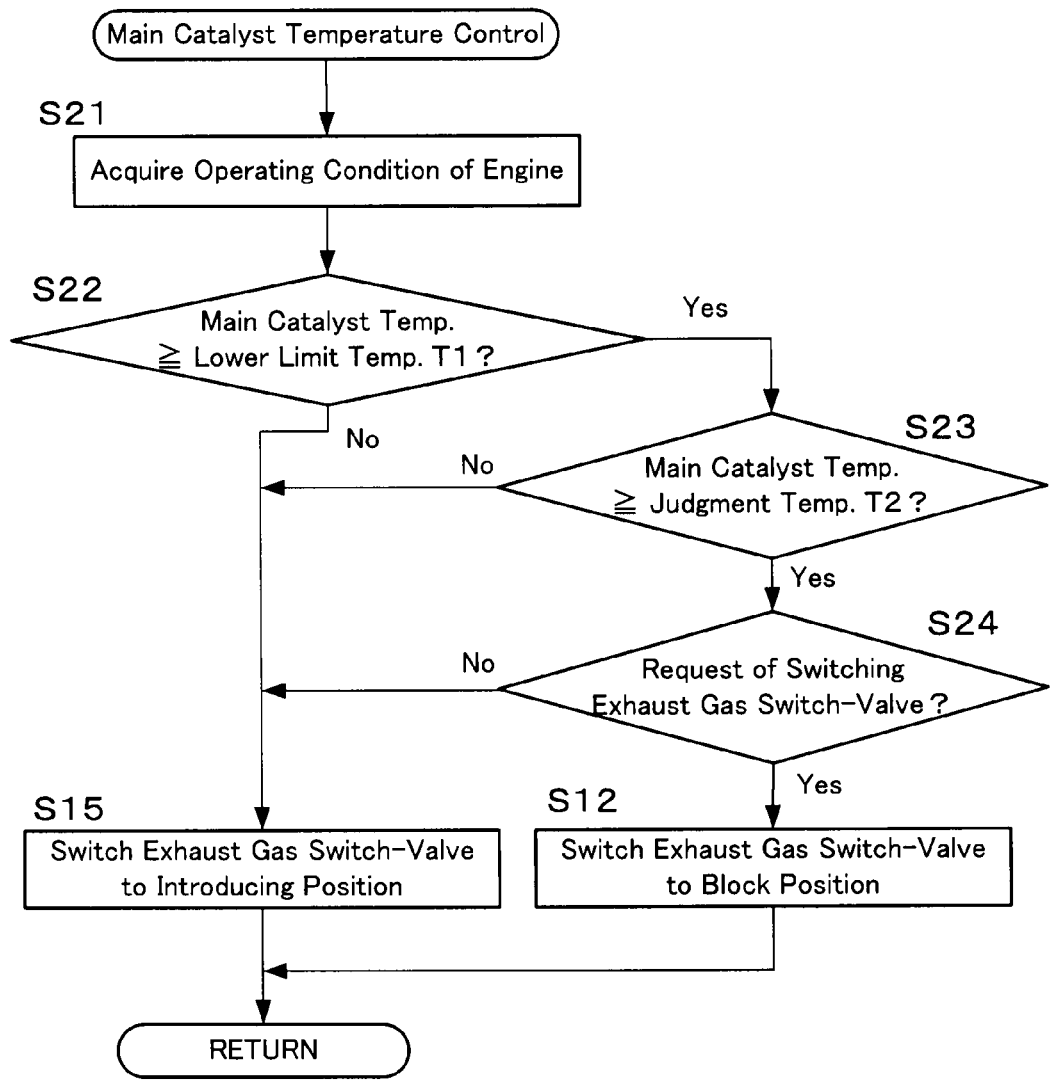
FIG. 4 is a flowchart showing a main catalyst temperature control routine executed by the ECU.

FIG. 4 shows a main catalyst temperature control routine executed by ECU 30 in order that the temperature of the main catalyst 11 should be controlled within a prescribed active temperature zone where the main catalyst 11 exhibits cleaning performance. The control routine of FIG. 4 is executed repeatedly in a prescribed period during operation of the engine in parallel with other routines executed by ECU 30. Additionally, the same processes in FIG. 4 as those in FIG. 3 have same reference numbers and their description will be omitted.

In the control routine of FIG. 4, first at step S21, ECU 30 acquires an operating condition of the engine 1. For example, ECU 30 acquires a rotation number and load of the engine 1, a temperature Tm of the main catalyst 11, a temperature Ts of the starter catalyst 23, a cooling water temperature and the like as an operating condition of the engine 1. Additionally, a rotation number of the engine 1 may be acquired on the basis of the output signal of the crank angle sensor 31, and load of the engine 1 may be acquired on the basis of the output signal of the airflow meter 6. Moreover, a temperature Tm of the main catalyst 11 and a temperature Ts of the starter catalyst 23 may be estimated on the basis of operating conditions of the engine 1, such as a rotation number and load of the engine 1, respectively. By acquiring a temperature of each catalyst 11, 23 in this manner, ECU 30 functions as a catalyst temperature acquiring device of the present invention. Temperatures of these catalysts may be acquired by disposing a temperature sensor at each of the main catalyst 11 and the starter catalyst 23. At the subsequent step S22, ECU 30 determines whether or not the temperature Tm of the main catalyst 11 is at or higher than the lower limit temperature T1 of a prescribed active temperature zone, where the catalyst exhibits cleaning performance. When ECU 30 determines that the temperature Tm of the main catalyst 11 is lower than the lower limit temperature T1, the process advances to step S15, and ECU 30 switches the exhaust gas switching valve 26 to the introducing position P1. Thereafter, ECU 30 ends the current control routine.

On the other hand, when ECU 30 determines that the temperature Tm of the main catalyst 11 is at or higher than the lower limit temperature T1, the process advances to step S23, and ECU 30 determines whether or not the temperature Tm of the main catalyst 11 is at or higher than a preset active judgment temperature T2. The active judgment temperature T2 is a temperature set as a measure for determining whether or not the main catalyst 11 exhibits cleaning performance, and is set at a temperature which is higher than the lower limit temperature T1 and within a prescribed active temperature zone. When ECU 30 determines that the temperature Tm of the main catalyst 11 is at or higher than the active judgment temperature T2, the process advances to step S24, and ECU 30 determines whether or not a request of switching the exhaust gas switching valve 26 to the block position P2 is made in other routines executed by ECU 30. When ECU 30 determines that the request of switching the exhaust gas switching valve 26 to the block position P2 is made, the process advances to step S12, and ECU 30 switches the exhaust gas switching valve 26 to the block position P2. Thereafter, ECU 30 ends the current control routine. When step S23 is determined negatively or step S24 is determined negatively, the process advances to step S15, and ECU 30 switches the exhaust gas switching valve 26 to the introducing position P1. Thereafter, ECU 30 ends the current control routine.

In the control routine of FIG. 4, the exhaust gas switching valve 26 is maintained at the introducing position P1 until the temperature Tm of the main catalyst 11 becomes at or higher than the active judgment temperature T2, namely, until the main catalyst 11 exhibits enough cleaning performance. And thus, exhaust gas emitted from each cylinder 2 of the engine 1 can be cleaned in both of the starter catalyst 23 and the main catalyst 11. Accordingly, degradation of exhaust emission can be suppressed. Additionally, it may be determined on the basis of the temperature of cooling water in the engine 1 whether or not the temperature Tm of the main catalyst 11 is at or higher than the lower limit temperature T1. For example, the temperature of cooling water at the time when the temperature Tm of the main catalyst 11 becomes at or higher than the lower limit temperature T1 may be obtained in advance experimentally or the like, and may be set as a judgment water temperature. At step S22, it may be determined whether or not the temperature Tm of the main catalyst 11 is at or higher than the lower limit temperature on the basis of whether or not the temperature of cooling water is at or higher than the judgment water temperature, instead of using the temperature Tm of the main catalyst 11.

Figure 5:
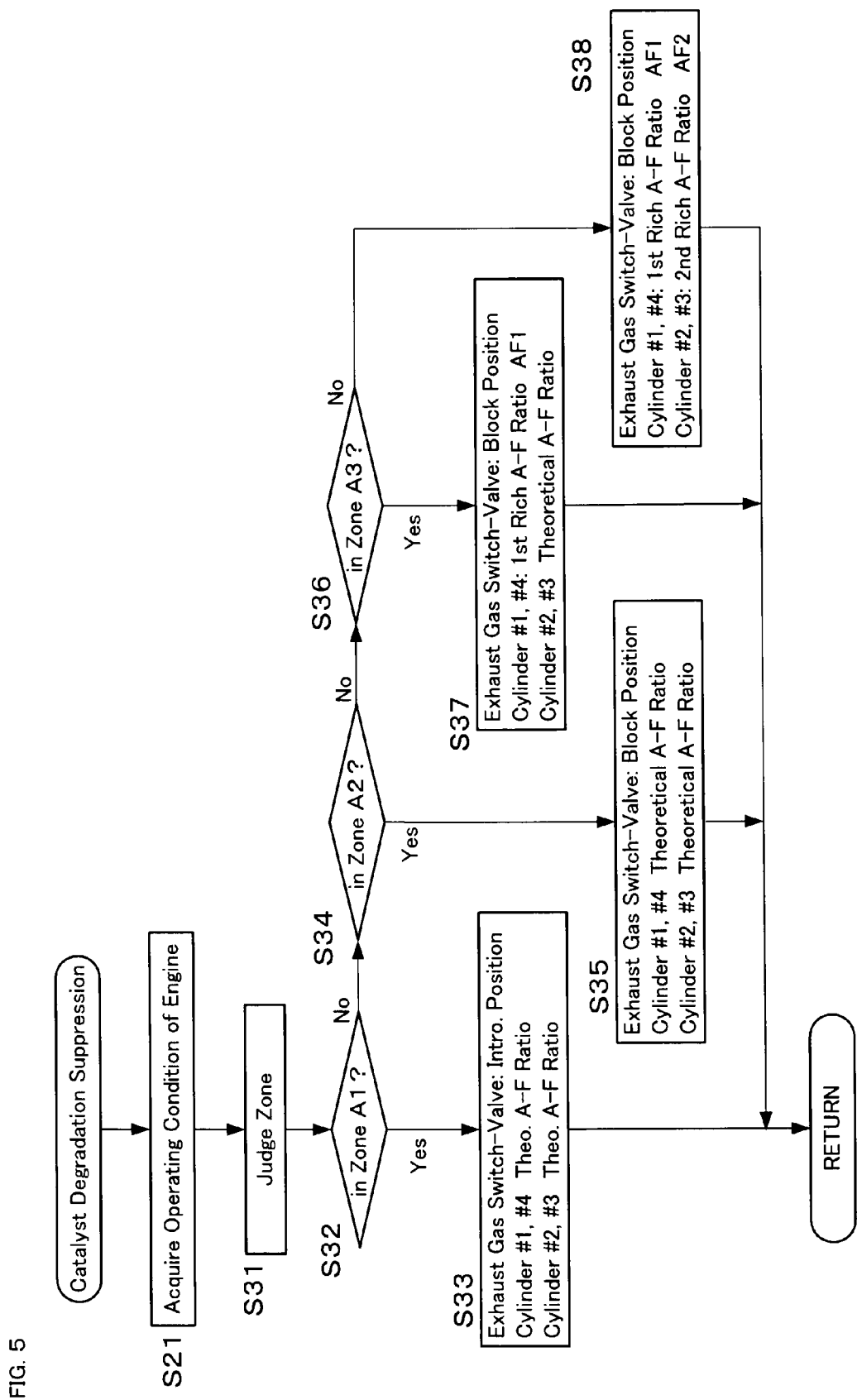
FIG. 5 is a flowchart showing a catalyst degradation suppressing routine executed by the ECU.

As well known, when a three way catalyst, which is disposed as a starter catalyst 23, is overheated at or higher than a prescribed degrading temperature, degradation thereof is accelerated, so that exhaust gas cleaning performance is degraded. Therefore, ECU 30 executes a catalyst degradation suppressing routine shown in FIG. 5 in order that degradation of the starter catalyst 23 should be suppressed. Additionally, the routine of FIG. 5 is executed repeatedly in a prescribed period during operation of the engine 1 in parallel with other routines executed by ECU 30. The same processes in FIG. 5 as those in FIG. 3 have same reference numbers and their description will be omitted.

Figure 6:
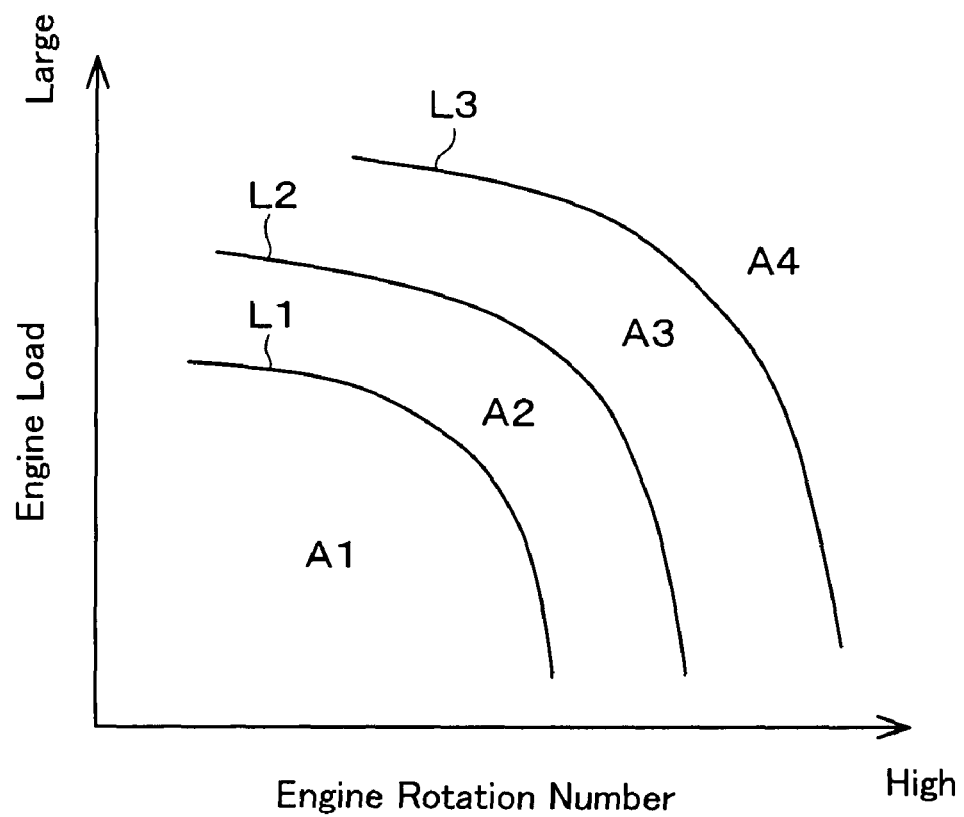
FIG. 6 is a view showing an example of corresponding relationships between a rotation number and load of an engine and each zone.

In the routine of FIG. 5, first at step S21, ECU 30 acquires an operating condition of the engine 1. At the next step S31, ECU 30 judges whether the operating condition of the engine 1 is at an operating condition in any one of preset zones A1-A4. FIG. 6 is a view showing an example of corresponding relationships between a rotation number and load of the engine 1 and each zone A1-A4. The line L1 in FIG. 6 indicates a boundary line of an operating condition, where the temperature Ts of the starter catalyst 23 becomes at or higher than a prescribed overheat judgment temperature To when the exhaust gas switching valve 26 is at the introducing position P1. Additionally, the overheat judgment temperature To is set in such order of temperature that, when the temperature Ts of the starter catalyst 23 is at the overheat judgment temperature To, the temperature Ts of the starter catalyst 23 does not reach the degrading temperature even when the temperature of exhaust gas increases, for example. The line L2 in FIG. 6 indicates a boundary line of an operating condition, where the temperature Ts of the starter catalyst 23 becomes at or higher than the overheat judgment temperature To when the exhaust gas switching valve 26 is at the block position P2. The line L3 in FIG. 6 indicates a boundary line of an operating condition, where the temperature of exhaust gas emitted from each cylinder 2 (#1-#4) becomes at or higher than a prescribed allowable upper limit temperature Teh when the air-fuel ratio in each cylinder 2 (#1, #4) is controlled at an air-fuel ratio AF1 on a richer side than the theoretical air-fuel ratio (it may be referred as a first rich air-fuel ratio in the following) and the air-fuel ratio in each cylinder 2 (#2, #3) is controlled at the theoretical air-fuel ratio. The prescribed allowable upper limit temperature Teh is set in view of heat resistance of exhaust components disposed in the exhaust passage 4, such as an exhaust valve and a turbine 7b. The allowable upper limit temperature Teh is set, for example, at a lower temperature than a heat resisting temperature of the turbine 7b and higher than the overheat judgment temperature To. The first rich air-fuel ratio AF1 is set in such a manner that the temperature of exhaust gas emitted from each cylinder 2 (#1, #4) controlled at the first rich air-fuel ratio AF1 can be reduced to lower than the temperature of exhaust gas from the cylinder 2 (#1, #4) controlled at the theoretical air-fuel ratio.

At the subsequent step S32, ECU 30 determines whether or not the operating condition of the engine 1 is at an operating condition in the zone A1. When ECU 30 determines that the operating condition of the engine 1 is at an operating condition in the zone A1, the process advances to step S33, and ECU 30 switches the exhaust gas switching valve 26 to the introducing position P1, and controls the operation of each injector 10 such that the air-fuel ratio in each cylinder 2 (#1-#4) is controlled at the theoretical air-fuel ratio. In a case that the exhaust gas switching valve 26 has been already switched to the introducing position P1, ECU 30 maintains the condition. Similarly, in a case that the operation of each injector 10 has been already controlled in such a manner that the air-fuel ratio in each cylinder 2 (#1-#4) is controlled at the theoretical air-fuel ratio, ECU 30 continues the control. Thereafter, ECU 30 ends the current routine.

On the other hand, when ECU 30 determines that the operating condition of the engine 1 is at an operating condition in a zone other than zone A1, the process advances to step S34, and ECU 30 determines whether or not the operating condition of the engine 1 is at an operating condition in zone A2. When ECU 30 determines that the operating condition of the engine 1 is at an operating condition in zone A2, the process advances to step S35, and ECU 30 switches the exhaust gas switching valve 26 to the block position P2, and controls the operation of each injector 10 such that the air-fuel ratio in each cylinder 2 (#1-#4) is controlled at the theoretical air-fuel ratio. Additionally, in a case that the exhaust gas switching valve 26 has been already switched to the block position P2, ECU 30 maintains the condition. Furthermore, in a case that the operation of each injector 10 has been already controlled in such a manner that the air-fuel ratio in each cylinder 2 (#1-#4) is controlled at the theoretical air-fuel ratio, ECU 30 continues the control. Thereafter, ECU 30 ends the current routine. In this manner, the amount of exhaust gas flowing in the starter catalyst 23 can be reduced by switching the exhaust gas switching valve 26 to the block position P2. And thus, the temperature Ts of the starter catalyst 23 can be reduced, and an increase of the temperature can be suppressed.

On the other hand, when ECU 30 determines that the operating condition of the engine 1 is at an operating condition in a zone other than zone A2, the process advances to step S36, and ECU 30 determines whether or not the operating condition of the engine 1 is at an operating condition in the zone A3. When ECU 30 determines that the operating condition of the engine 1 is at an operating condition in the zone A3, the process advances to step S37, and ECU 30 switches the exhaust gas switching valve 26 to the block position P2, and controls the operation of each injector 10 in such a manner that the air-fuel ratio in each cylinder 2 (#1, #4) is controlled at the first rich air-fuel ratio AF1 and the air-fuel ratio in each cylinder 2 (#2, #3) is controlled at the theoretical air-fuel ratio, respectively. Additionally, in a case that the exhaust gas switching valve 26 and each injector 10 have already been controlled in these conditions, ECU 30 continues the control. Thereafter, ECU 30 ends the current routine. By controlling the air-fuel ratio in each cylinder 2 (#1, #4) at the first rich air-fuel ratio AF1 in this manner, the temperature of exhaust gas flowing in the starter catalyst 23 can be reduced. Accordingly, the temperature Ts of the starter catalyst 23 can be reduced, and an increase of the temperature can be suppressed. By executing the process, ECU 30 functions as a catalyst temperature increase suppressing device of the present invention.

On the other hand, when ECU 30 determines that the operating condition of the engine 1 is at an operating condition in a zone other than zone A3, the process advances to step S38, and ECU 30 switches the exhaust gas switching valve 26 to the block position P2, and controls the operation of each injector 10 in such a manner that the air-fuel ratio in each cylinder 2 (#1, #4) is controlled at the first rich air-fuel ratio AF1 and the air-fuel ratio in each cylinder 2 (#2, #3) is controlled at an air-fuel ratio AF2 (it may be referred as a second rich air-fuel ratio in the following.), respectively. The air-fuel ratio AF2 is on a richer side than the theoretical air-fuel ratio and on a leaner side than the first rich air-fuel ratio AF1. Additionally, in a case that the exhaust gas switching valve 26 and each injector 10 have already been controlled in the condition, ECU 30 continues the control. Thereafter, ECU 30 ends the current routine. Accordingly, the temperature of exhaust gas emitted from each cylinder 2 (#1, #4) can be reduced, and thus the temperature Ts of the starter catalyst 23 can be reduced or an increase of the temperature can be suppressed. Furthermore, the temperature of exhaust gas emitted from the cylinders 2 (#2, #3) can be reduced by controlling the air-fuel ratio in each cylinder 2 (#2, #3) at the second rich air-fuel ratio AF2, and thus fire damage of exhaust components such as a turbine 7b can be prevented. By executing the process, ECU 30 functions as an air-fuel ratio changing-to-richer-side device of the present invention.

By executing the routine of FIG. 5, at least any one of the exhaust gas switching valve 26 and the air-fuel ratio in each cylinder 2 (#1-#4) is controlled when the temperature Ts of the starter catalyst 23 becomes at or higher than a prescribed overheat judgment temperature To, so that the temperature Ts of the starter catalyst 23 is reduced or an increase of the temperature is suppressed. And thus, overheat of the starter catalyst 23 can be prevented. Furthermore, the air-fuel ratio in the cylinder 2 (#2, #3) is controlled at the second rich air-fuel ratio when the temperature of exhaust gas becomes at or higher than the allowable upper limit temperature Teh, and thus fire damage of exhaust components such as a turbine 7b and an exhaust valve can be prevented.

Figure 7:
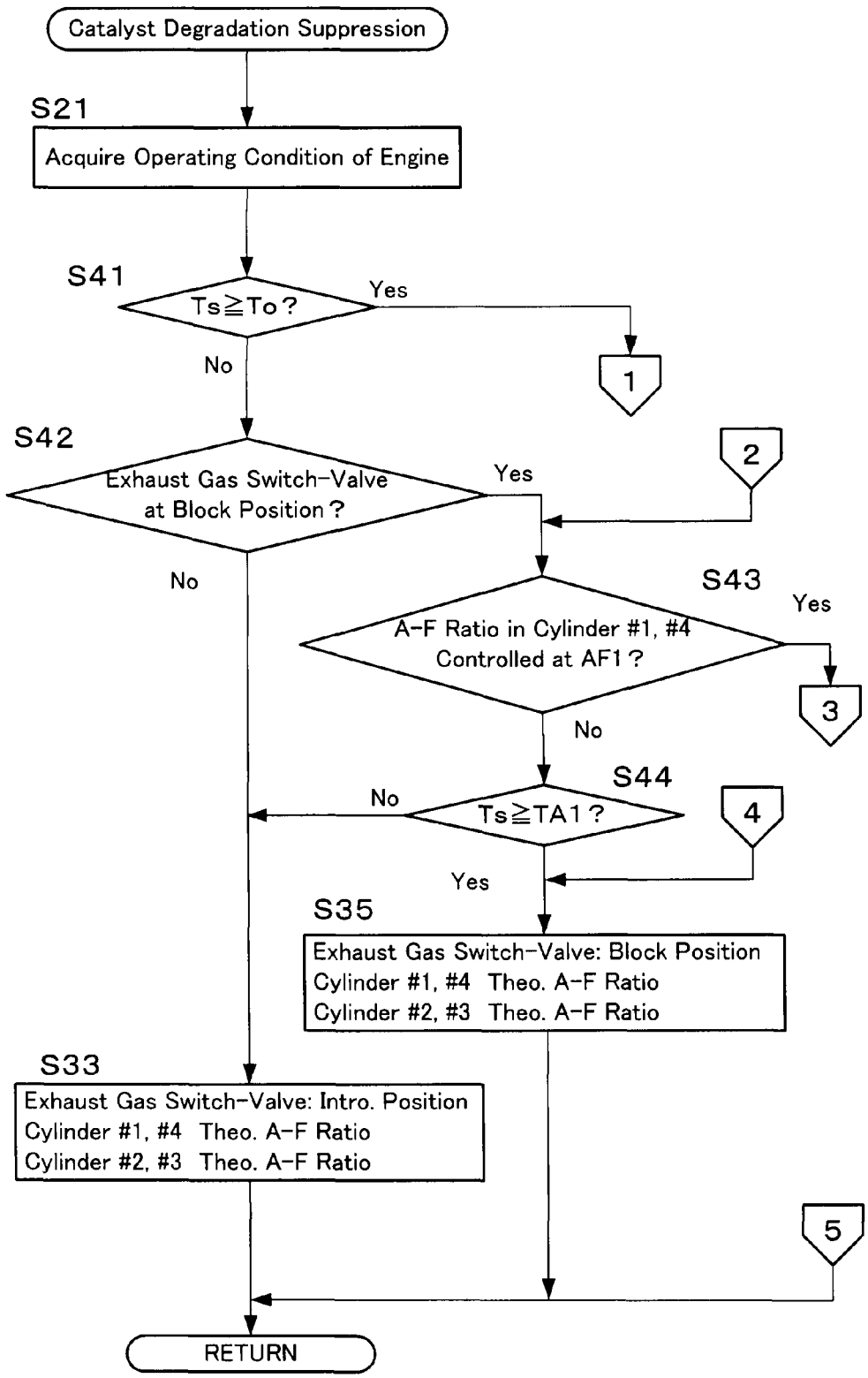
FIG. 7 is a flowchart showing a variation of the catalyst degradation suppressing routine.
Figure 8:
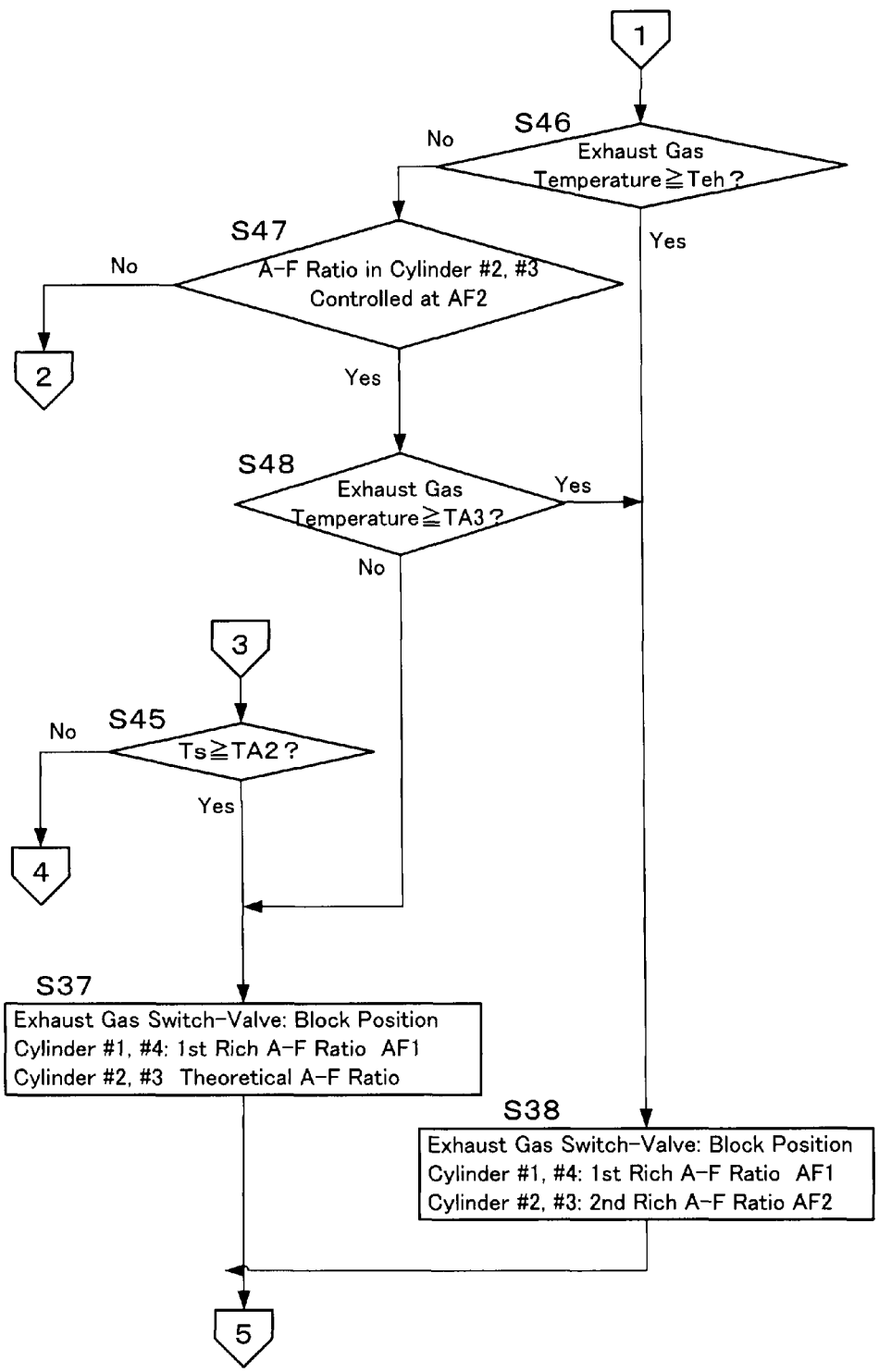
FIG. 8 is a subsequent flowchart of FIG. 7.

FIG. 7 and FIG. 8 show a variation of the catalyst degradation suppressing routine. Additionally, FIG. 8 is a subsequent flowchart of FIG. 7. The same processes in FIG. 7 and FIG. 8 as those in FIG. 4 or FIG. 5 have the same reference numbers, and their description will be simplified or omitted.

In the routine of FIG. 7, first at step S21, ECU 30 acquires an operating condition of the engine 1. At the next step S41, ECU 30 determines whether or not the temperature Ts of the starter catalyst 23 is at or higher than an overheat judgment temperature To. The overheat judgment temperature To is same as the temperature used in setting the line L1 in FIG. 6. When ECU 30 determines that the temperature Ts of the starter catalyst 23 is lower than the overheat judgment temperature To, the process advances to step S42, and ECU 30 determines whether or not the exhaust gas switching valve 26 is at the block position P2. When ECU 30 determines that the exhaust gas switching valve 26 is at the introducing position P1, the process advances to step S33, and ECU 30 switches the exhaust gas switching valve 26 to the introducing position P1, and controls the operation of each injector 10 in such a manner that the air-fuel ratio in each cylinder 2 (#1-#4) is controlled at the theoretical air-fuel ratio. Namely, it is determined that the operating condition of the engine 1 is at an operating condition corresponding to the zone A1 in FIG. 6. Thereafter, ECU 30 ends the current routine.

On the other hand, when ECU 30 determines that the exhaust gas switching valve 25 is at the block position P2, the process advances to step S43, and ECU 30 determines whether or not the air-fuel ratio in each cylinder 2 (#1, #4) is controlled at a first rich air-fuel ratio AF1. The first rich air-fuel ratio AF1 is same as the air-fuel ratio used in setting the line L3 in FIG. 6. When ECU 30 determines that the air-fuel ratio in each cylinder 2 (#1, #4) is not controlled at the first rich air-fuel ratio AF1, the process advances to step S44, and ECU 30 determines whether or not the temperature Ts of the starter catalyst 23 is at or higher than a first zone judgment temperature TA1. The first zone judgment temperature TA1 is a temperature set as a measure for determining whether or not the operating condition of the engine 1 was previously in a zone other than zone A1 in FIG. 6 but has been changed to zone A1 in FIG. 6. Therefore, a little lower temperature than the overheat judgment temperature To is set as the first zone judgment temperature TA1, so that it can be determined that the operating condition of the engine 1 has been surely changed to zone A1. When ECU 30 determines that the temperature Ts of the starter catalyst 23 is lower than the first zone judgment temperature TA1, it executes the process at step S33 and thereafter ends the current routine. On the other hand, when ECU 30 determines that the temperature Ts of the starter catalyst 23 is at or higher than the first zone judgment temperature TA1, the process advances to step S35, and ECU 30 switches the exhaust gas switching valve 26 to the block position P2, and controls the operation of each injector 10 in such a manner that the air-fuel ratio in each cylinder 2 (#1-#4) is controlled at the theoretical air-fuel ratio. Namely, it is determined that the operating condition of the engine 1 is at an operating condition corresponding to the zone A2 in FIG. 6. Thereafter, ECU 30 ends the current routine.

At step S43, when ECU 30 determines that the air-fuel ratio in each cylinder 2 (#1, #4) is controlled at the first rich air-fuel ratio AF1, the process advances to step S45 in FIG. 8, and ECU 30 determines whether or not the temperature Ts of the starter catalyst 23 is at or higher than a second zone judgment temperature TA2. The second zone judgment temperature TA2 is a temperature set as a measure for determining whether or not the operating condition of the engine 1 was previously at an operating condition in the zone A3 or the zone A4 in FIG. 6 but has changed in the zone A2 in FIG. 6. A temperature which is a little lower than the overheat judgment temperature To and differs from the first zone judgment temperature TA1 is set as the second zone judgment temperature TA2 in such a manner that it can be determined that the operating condition of the engine 1 has been surely changed in the zone A2. When ECU 30 determines that the temperature Ts of the starter catalyst 23 is lower than the second zone judgment temperature TA2, it executes the process at step S35 in FIG. 7 and thereafter ends the current routine. On the other hand, when ECU 30 determines that the temperature Ts of the starter catalyst 23 is at or higher than the second zone judgment temperature TA2, the process advances to step S37, and ECU 30 switches the exhaust gas switching valve 26 to the block position P2, and controls the operation of each injector 10 in such a manner that the air-fuel ratio in each cylinder 2 (#1, #4) is controlled at the first rich air-fuel ratio AF1 and the air-fuel ratio in each cylinder 2 (#2, #3) is controlled at the theoretical air-fuel ratio, respectively. Namely, it is determined that the operating condition of the engine 1 is at an operating condition corresponding to the zone A3 in FIG. 6. Thereafter, ECU 30 ends the current routine.

When ECU 30 determines at step S41 that the temperature Ts of the starter catalyst 23 is at or higher than the overheat judgment temperature To, the process advances to step S46, and ECU 30 determines whether or not the temperature of exhaust gas emitted from each cylinder 2 (#1-#4) is at or higher than a prescribed allowable upper limit temperature Teh. The allowable upper limit temperature Teh is same as the temperature used in setting the line L3 in FIG. 6. When ECU 30 determines that the temperature of exhaust gas is lower than the allowable upper limit temperature Teh, the process advances to step S47, and ECU 30 determines whether or not the air-fuel ratio in each cylinder 2 (#2, #3) is controlled at a second rich air-fuel ratio AF2. The second rich air-fuel ratio AF2 is the same as the air-fuel ratio controlled at step S38 in FIG. 5. When ECU 30 determines that the air-fuel ratio in each cylinder 2 (#2, #3) is not controlled at the second rich air-fuel ratio AF2, the process advances to step S43 in FIG. 7; and the following steps are processed in a similar manner to the above description. On the other hand, when ECU 30 determines that the air-fuel ratio in each cylinder 2 (#2, #3) is controlled at the second rich air-fuel ratio AF2, the process advances to step S48, and ECU 30 determines whether or not a temperature of exhaust gas emitted from each cylinder 2 (#1-#4) is at or higher than a third zone judgment temperature TA3. The third zone judgment temperature TA3 is a temperature set as a measure for determining whether or not an operating condition of the engine 1 was previously in the zone A4 in FIG. 6 but has changed in the zone A3. A little lower temperature than the allowable upper limit temperature Teh is set as the third zone judgment temperature TA3, so that it can be determined that the operating condition of the engine 1 has been surely changed in the zone A3 in FIG. 6. When ECU 30 determines that the temperature of exhaust gas is lower than the allowable upper limit temperature Teh, it executes the process at step S37 and thereafter ends the current routine.

When step S46 is determined affirmatively or when step S48 is determined affirmatively, the process advances to step S38, and ECU 30 switches the exhaust gas switching valve 26 to the block position P2, and controls the operation of each injector 10 in such a manner that the air-fuel ratio in each cylinder 2 (#1, #4) is controlled at the first rich air-fuel ratio AF1 and the air-fuel ratio in each cylinder 2 (#2, #3) is controlled at the second rich air-fuel ratio AF2, respectively. Thereafter, ECU 30 ends the current routine.

Also in the variation shown in FIG. 7 and FIG. 8, the exhaust gas switching valve 26 and the air-fuel ratio in each cylinder 2 (#1-#4) are controlled in a similar manner to FIG. 5 in accordance with the operating condition of the engine 1. And thus, overheat of the starter catalyst 23 can be prevented, and fire damage of exhaust components such as a turbine 7b and an exhaust valve can be prevented.

In a case that the exhaust gas switching valve 26 is switched to the block position P2, the back-pressure varies in the cylinder 2 (#1, #4) and in the cylinder 2 (#2, #3). In this case, the back-pressure exerting on the cylinder 2 (#2, #3) becomes lower than back-pressure exerting on the cylinder 2 (#1, #4), and thus volumetric efficiency in the cylinder 2 (#2, #3) becomes higher than that in the cylinder 2 (#1, #4). Furthermore, in a case that different air-fuel ratios are set in the cylinder 2 (#1, #4) and the cylinder 2 (#2, #3), different amounts of fuel are supplied to the cylinder 2 (#1, #4) and the cylinder 2 (#2, #3). As well known, the higher the volumetric efficiency or the greater the amount of fuel supply, the higher the torque in the cylinder becomes. Therefore in such cases, ECU 30 executes an ignition timing correcting routine of FIG. 9 repeatedly in a prescribed period during operation of the engine 1 in order that fluctuation in torque caused in each cylinder 2 (#1-#4) should be suppressed. The same processes in FIG. 9 as those in FIG. 4 and FIG. 5 have same reference numbers and their description will be omitted.

Figure 9:
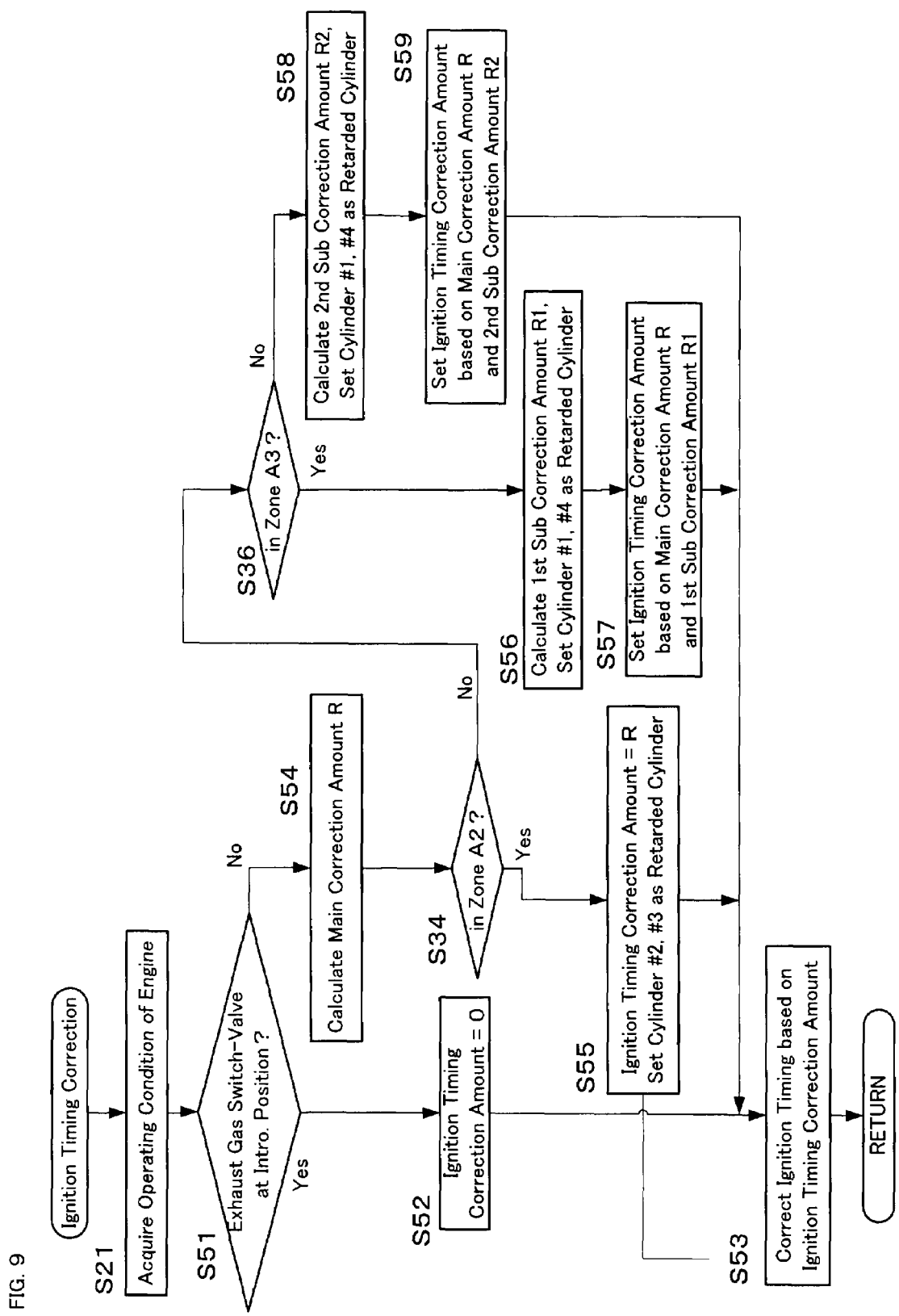
FIG. 9 is a flowchart showing an ignition timing correcting routine executed by the ECU.

In the routine of FIG. 9, first at step S21, ECU 30 acquires an operating condition of the engine 1. At the next step S51, ECU 30 determines whether or not the exhaust gas switching valve 26 is at the introducing position P1. When ECU 30 determines that the exhaust gas switching valve 26 is at the introducing position P1, the process advances to step S52, and ECU 30 assigns 0 to an ignition timing correction amount for correcting the ignition timing for a cylinder, which is set as a retarded cylinder for which the ignition timing is retarded. At the next step S53, ECU 30 corrects the ignition timing for the cylinder set as a retarded cylinder on the basis of the ignition timing correction amount. Thereafter, ECU 30 ends the current routine. Additionally, the ignition timing set in this routine is used in other routines executed by ECU 30 in order that the operation of the ignition plug 5 should be controlled.

When step S51 is determined negatively, namely, when it is determined that the exhaust gas switching valve 26 is at the block position P2, the process advances to step S54, and ECU 30 calculates a main correction amount R. As described above, when the exhaust gas switching valve 26 is at the block position P2, back-pressure of each cylinder 2 (#2, #3) is reduced. And thus, volumetric efficiency in the cylinders 2 increases. The main correction amount R is a value set for compensating the increase of torque due to the enhancement of volumetric efficiency by retarding the ignition timing. Since the increase amount of torque due to enhancement of volumetric efficiency varies in accordance with a rotation number and load of the engine 1, the main correction amount R is calculated on the basis of a rotation number and load of the engine 1. Therefore, the relationship between a rotation number and load of the engine 1 and a main correction amount R are obtained in advance experimentally or the like, and stored in the ROM of ECU 30 as a map. And then, the calculation may be made in reference to the map. Additionally, the main correction amount R may be set to a preset prescribed value. At the next step S34, ECU 30 determines whether or not the operating condition of the engine 1 is at an operating condition in the zone A2 in FIG. 6. When ECU 30 determines that the operating condition of the engine 1 is at an operating condition in the zone A2 in FIG. 6, the process advances to step S55, and ECU 30 assigns the main correction amount R to the ignition timing correction amount. Furthermore, ECU 30 sets each cylinder 2 (#2, #3) as a retarded cylinder. In this case, the ignition timing for each cylinder 2 (#2, #3) is retarded by the ignition timing correction amount. Next, ECU 30 executes the process at step S53 and thereafter ends the current routine.

When ECU 30 determines at step S34 that the operating condition of the engine 1 is in a zone other than zone A2 in FIG. 6, the process advances to step S36, and ECU 30 determines whether or not the operating condition of the engine 1 is at an operating condition in the zone A3 in FIG. 6. When ECU 30 determines that the operating condition of the engine 1 is at an operating condition in the zone A3 in FIG. 6, the process advances to step S56, and ECU 30 calculates a first sub correction amount R1. As described above, when the operating condition of the engine 1 is at an operating condition in the zone A3, the air-fuel ratio in each cylinder 2 (#2, #3) is controlled at the theoretical air-fuel ratio and the air-fuel ratio in each cylinder 2 (#1, #4) is controlled at the first rich air-fuel ratio AF1, respectively. And thus, more fuel is supplied to each cylinder 2 (#1, #4) than the amount of fuel supplied to each cylinder 2 (#2, #3). The first sub correction amount R1 is a value set in order to compensate the increase of torque in each cylinder 2 (#1, #4), which is caused due to the difference in amount of fuel, by retarding the ignition timing. The amount of fuel required to control the air-fuel ratio at the first rich air-fuel ratio AF1 varies in accordance with a rotation number and load of the engine 1, and thus an increased amount of torque in each cylinder 2 (#1, #4) is also correlated with them. Therefore, a map showing the relationship between a rotation number and load of the engine 1 and the first sub correction amount R1 is obtained in advance experimentally or the like, and is stored in the ROM of ECU 30. And then, the first sub correction amount R1 may be calculated with reference to the map. Furthermore, ECU 30 sets each cylinder 2 (#1, #4) as a retarded cylinder in this process. At the subsequent step S57, ECU 30 sets an ignition timing correction amount on the basis of the main correction amount R and the first sub correction amount R1. When the operating condition of the engine 1 is in the zone A3, the exhaust gas switching valve 26 is at the block position P2.

Therefore, back-pressure exerting on the cylinder 2 (#1, #4) becomes lower than back-pressure exerting on the cylinder 2 (#2, #3). Therefore, ECU 30 sets the ignition timing correction amount on the basis of the main correction amount R and the first sub correction amount R1. Namely, in a case that steps S56 and S57 have been executed, the ignition timing for each cylinder 2 (#1, #4) is retarded by the ignition timing correction amount. Next, ECU 30 executes the process at step S53 and thereafter ends the current routine.

When ECU 30 determines at step S36 that the operating condition of the engine 1 is in the zone A4 in FIG. 6, the process advances to step S58, and ECU 30 calculates a second sub correction amount R2. As described above, when the operating condition of the engine 1 is at an operating condition in the zone A4, the air-fuel ratio in each cylinder 2 (#2, #3) is controlled at the second rich air-fuel ratio AF2 and the air-fuel ratio in each cylinder 2 (#1, #4) is controlled at the first rich air-fuel ratio AF1, respectively. Since the second rich air-fuel ratio AF2 is on a leaner side than the first rich air-fuel ratio AF1, more fuel is supplied to each cylinder 2 (#1, #4) than the amount of fuel supplied to the cylinder 2 (#2, #3) also in this case. The second sub correction amount R2 is a value set in order that a difference between torque in each cylinder 2 (#1, #4) and torque in each cylinder 2 (#2, #3), which is caused due to the difference in the amount of supplied fuel, should be compensated by retarding the ignition timing for each cylinder 2 (#1, #4). Since the difference in the amount of fuel varies in accordance with a rotation number and load of the engine 1, the difference between torque in each cylinder 2 (#1, #4) and torque in each cylinder 2 (#2, #3) is also correlated with them. Therefore, a map showing the relationship between a rotation number and load of the engine 1 and the second sub correction amount R2 is obtained in advance experimentally or the like and stored in the ROM of ECU 30. And then, the second sub correction amount R2 may be calculated with reference to the map. Furthermore, ECU 30 sets each cylinder 2 (#1, #4) as a retarded cylinder in this process. At the subsequent step S59, ECU 30 sets the ignition timing correction amount on the basis of the main correction amount R and the second sub correction amount R2. When the operating condition of the engine 1 is in the zone A4, the exhaust gas switching valve 26 is also at the block position P2. Therefore, ECU 30 sets the ignition timing correction amount on the basis of the main correction amount R and the second sub correction amount R2. Namely, when steps S58 and S59 are executed, the ignition timing for each cylinder 2 (#1, #4) is also retarded by the ignition timing correction amount. Next, ECU 30 executes the process at step S53 and thereafter ends the current routine.

By executing the routine of FIG. 9 in this manner, the retarded cylinder and the ignition timing correction amount are set properly in accordance with the operating condition of the engine 1. And thus, fluctuation in torque in each cylinder 2 (#1-#4) can be suppressed. Therefore, fluctuation in torque can be suppressed in the engine 1. By executing the control routine of FIG. 9 in this manner to control the ignition timing, ECU 30 functions as an ignition timing control device of the present invention.

ECU 30 controls amount of fuel supplied to each cylinder 2 in a feedback manner, in order that the air-fuel ratio in each cylinder 2 (#1-#4) should be controlled with good accuracy at a target air-fuel ratio, such as the theoretical air-fuel ratio, the first rich air-fuel ratio, or the second rich air-fuel ratio. More specifically, ECU 30 sets amount of feedback correction for an amount of fuel supply on the basis of the output of the first air-fuel ratio sensor 24, the second air-fuel ratio sensor 14, or the O2 sensor 15, and corrects the amount of fuel supplied to each cylinder 2 in accordance with the set amount of feedback correction. ECU 30 executes a main feedback control (main F/B control) and a sub feedback control (sub F/B control) in a feedback manner. In the main F/B control, the amount of feedback correction for the amount of fuel supply is set on the basis of the output of the first air-fuel ratio sensor 24 in order that the air-fuel ratio detected by the sensor 24 should be matched with the target air-fuel ratio. And then, the amount of fuel supply is corrected on the basis of the correction amount. On the other hand, in the sub F/B control, the amount of feedback correction is corrected on the basis of the output of the O2 sensor 15, in order that degradation in accuracy of the amount of feedback correction obtained on the basis of the first air-fuel ratio sensor 24 should be compensated. Additionally, these control methods may be same as those well known control methods, and thus their detailed description will be omitted. By executing feedback corrections in this manner, ECU 30 functions as a feedback correcting device of the present invention.

Figure 10:
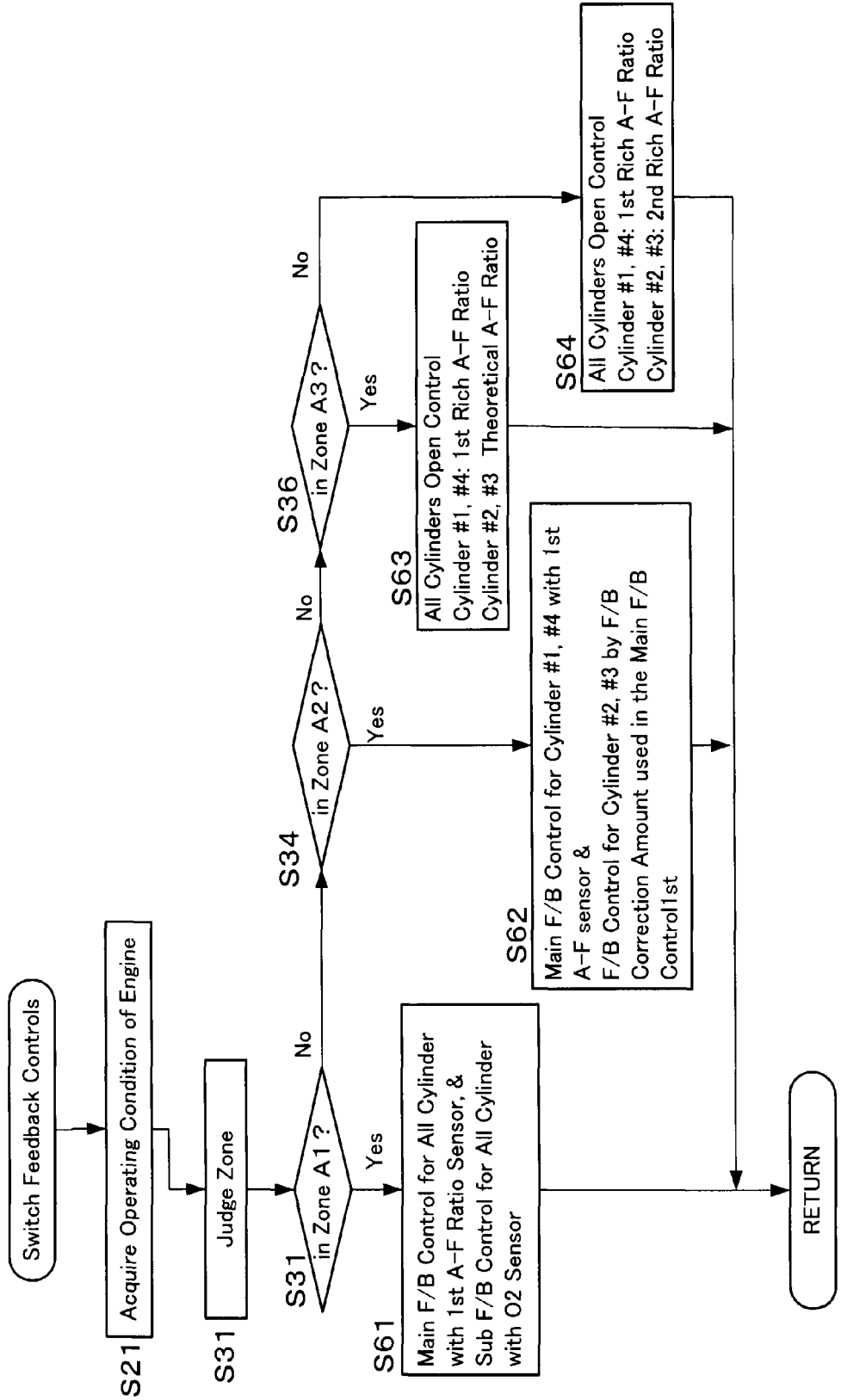
FIG. 10 is a flowchart showing a feedback control switch routine executed by the ECU.

FIG. 10 shows a feedback control switch routine executed by ECU 30 in such a manner that these feedback controls are executed properly in accordance with the operating condition of the engine 1. The routine of FIG. 10 is executed repeatedly in a prescribed period during operation of the engine 1. Additionally, the same processes in FIG. 10 as those in FIG. 4 and FIG. 5 have same reference numbers and their description will be omitted.

In the routine of FIG. 10, first at step S21, ECU 30 acquires an operating condition of the engine 1. At the subsequent step S31, ECU 30 judges whether the operating condition of the engine 1 is at an operating condition in any of the zones A1-A4. At the next step S32, ECU 30 determines whether or not the operating condition of the engine 1 is at an operating condition in the zone A1. When ECU 30 determines that the operating condition of the engine 1 is at an operating condition in the zone A1, the process advances to step S61, and ECU 30 executes the main F/B control for all cylinders 2 (#1-#4) on the basis of the output of the first air-fuel ratio sensor 24, and executes the sub F/B control for all cylinders 2 (#1-#4) on the basis of the output of the O2 sensor 15, respectively. Thereafter, ECU 30 ends the current routine.

On the other hand, when ECU 30 determines that the operating condition of the engine 1 is at an operating condition in a zone other than zone A1, the process advances to step S34, and ECU 30 determines whether or not the operating condition of the engine 1 is at an operating condition in the zone A2. When ECU 30 determines that the operating condition of the engine 1 is at an operating condition in the zone A2, the process advances to step S62, and ECU 30 executes the main F/B control for each cylinder 2 (#1, #4) on the basis of the output of the first air-fuel ratio sensor 24, and executes a feedback correction for each cylinder 2 (#2, #3) by the amount of feedback correction set in the main F/B control. When the operating condition of the engine 1 is at an operating condition in other zone than in the zone A1, the exhaust gas switching valve 26 is switched to the block position P2. And thus, the air-fuel ratio in each cylinder 2 (#2, #3) cannot be detected by the first air-fuel ratio sensor 24. Therefore, ECU 30 can execute the main F/B control for each cylinder 2 (#1, #4), but cannot execute the main F/B control for each cylinder 2 (#2, #3). On the other hand, in the zone A2, the air-fuel ratio in each cylinder 2 (#1-#4) is controlled at the theoretical air-fuel ratio. And thus, it can be considered that the amount of fuel supplied to each cylinder 2 (#2, #3) and the amount of fuel supplied to each cylinder 2 (#1, #4) are almost same. Therefore, ECU 30 executes a feed back control for the amount of fuel supplied to each cylinder 2 (#2, #3) by using the amount of feedback correction set in the main F/B control for each cylinder 2 (#1, #4). In this way, ECU 30 can control the air-fuel ratio of exhaust gas emitted from each cylinder 2 (#2, #3) at the target air-fuel ratio (the theoretical air-fuel ratio). Thereafter, ECU 30 ends the current routine.

On the other hand, when ECU 30 determines that the operating condition of the engine 1 is at an operating condition in a zone other than zone A2, the process advances to step S36, and ECU 30 determines whether or not the operating condition of the engine 1 is at an operating condition in the zone A3. When ECU 30 determines that the operating condition of the engine 1 is at an operating condition in the zone A3, the process advances to step S63, and ECU 30 controls the amount of fuel supplied to all cylinders 2 (#1-#4) in the open loop control, such that the air-fuel ratio in each cylinder 2 (#1, #4) is controlled at the first rich air-fuel ratio AF1 and the air-fuel ratio in each cylinder 2 (#2, #3) is controlled at the theoretical air-fuel ratio. Namely, the feedback control is canceled. Thereafter, ECU 30 ends the current routine.

On the other hand, when ECU 30 determines that the operating condition of the engine 1 is at an operating condition in a zone other than zone A3, the process advances to step S64, and ECU 30 controls the amount of fuel supplied to all cylinders 2 (#1-#4) in the open loop control, in such a manner that the air-fuel ratio in each cylinder 2 (#1, #4) is controlled at the first rich air-fuel ratio AF1 and the air-fuel ratio in each cylinder 2 (#2, #3) is controlled at the second rich air-fuel ratio AF2. In this case also, the feedback control is canceled. Thereafter, ECU 30 ends the current routine.

In the routine of FIG. 10, the exhaust gas switching valve 26 is switched to the block position P2. Even when the air-fuel ratio of the exhaust gas from each cylinder 2 (#2, #3) cannot be detected by the first air-fuel ratio sensor 24, the amount of fuel supplied to each cylinder 2 (#2, #3) is corrected in the zone A2 by the amount of feedback correction for each cylinder 2 (#1, #4), and thus control accuracy for the air-fuel ratio in each cylinder 2 (#2, #3) can be improved. Accordingly, the air-fuel ratio of the exhaust gas in the main catalyst 11 can be controlled at the theoretical air-fuel ratio with good accuracy. And thus, degradation of exhaust gas cleaning performance in the main catalyst 11 can be suppressed, and quality of exhaust emission can be improved in a case that the engine 1 is operated at an operating condition in the zone A2.

Since air-fuel ratios in all cylinders 2 (#1-#4) are controlled at the theoretical air-fuel ratio in the zone A2, the main F/B control and the sub F/B control can be executed in such a manner that air-fuel ratios detected by the second air-fuel ratio sensor 14 and the O2 sensor 15 becomes at the theoretical air-fuel ratio. Therefore, ECU 30 may execute the main F/B control for all cylinders 2 (#1-#4) by using the second air-fuel ratio sensor 14 and execute the sub F/B control for all cylinders 2 (#1-#4) by using the O2 sensor 15 at step S62 in FIG. 10, instead of executing a feedback control for each cylinder 2 (#2, #3) by using the amount of feedback correction set in the main F/B control for each cylinder 2 (#1, #4).

Figure 11:
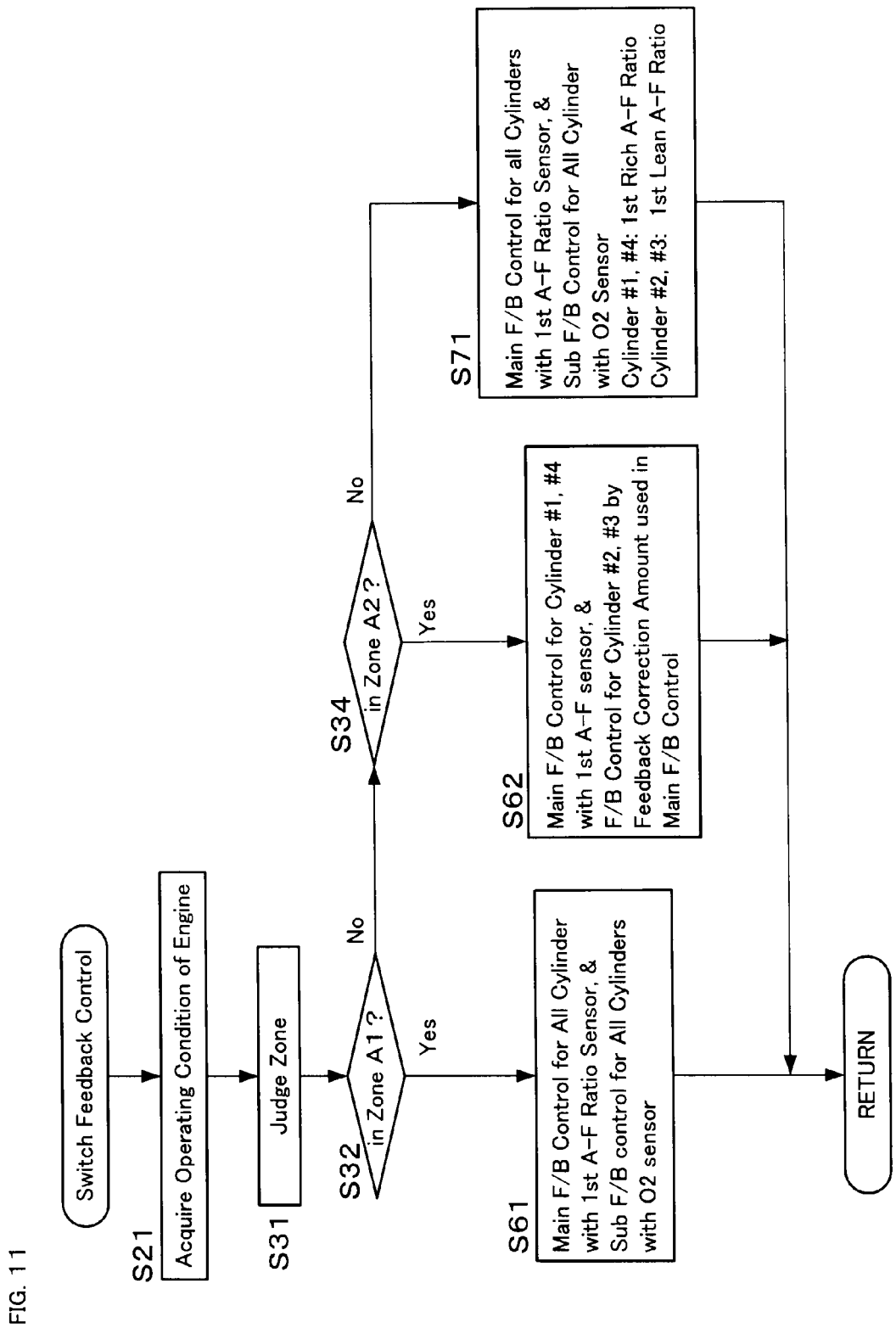
FIG. 11 is a flowchart showing a variation of the feedback control switch routine.

FIG. 11 shows a variation of the feedback control switch routine. FIG. 11 differs from FIG. 10 in that a step S71 is provided instead of steps S36, S63, and S64. Other steps are same as those in FIG. 10, and their description will be omitted.

When step S34 is determined negatively in FIG. 11, the process advances to step S71, and ECU 30 controls the air-fuel ratio in each cylinder 2 (#1, #4) at the first rich air-fuel ratio AF1, and controls the air-fuel ratio in each cylinder 2 (#2, #3) at a lean air-fuel ratio AFL. The lean air-fuel ratio AFL is set in such a manner that, when exhaust gas having the lean air-fuel ratio AFL is mixed with exhaust gas having the first rich air-fuel ratio AF1, the air-fuel ratio of the mixed exhaust gas becomes almost same as the theoretical air-fuel ratio. Therefore, the lean air-fuel ratio AFL is set on the basis of the first rich air-fuel ratio AF1. In this case, the air-fuel ratio in each cylinder 2 (#1, #4) in which the air-fuel ratio is controlled at the first rich air-fuel ratio AF1 can be detected by the first air-fuel ratio sensor 24. And thus, the main F/B control for each cylinder 2 (#2, #3) can be executed by using the output of the first air-fuel ratio sensor 24. Moreover, as described above, the lean air-fuel ratio AFL is set in such a manner that the air-fuel ratio of the mixed exhaust gas becomes almost same as the theoretical air-fuel ratio when exhaust gas having the lean air-fuel ratio AFL is mixed with exhaust gas having the first rich air-fuel ratio AF1. And thus, the sub F/B control for each cylinder #2, #3 can be also executed in such a manner that the air-fuel ratio detected by the O2 sensor 15 disposed downstream of the turbine 7b becomes the theoretical air-fuel ratio. Therefore, ECU 30 executes the main F/B control for all cylinders 2 (#1-#4) on the basis of the output of the first air-fuel ratio sensor 24 and executes the sub F/B control for all cylinders 2 (#1-#4) on the basis of the output of the O2 sensor 15, respectively. Thereafter, ECU 30 ends the current routine.

By controlling the air-fuel ratio in each cylinder 2 (#2, #3) in this manner at the lean air-fuel ratio AFL, ECU 30 can execute the main F/B control for all cylinders 2 (#1-#4) and the sub F/B control for all cylinders 2 (#1-#4), respectively. And thus, control accuracy for the air-fuel ratio in each cylinder 2 can be improved.

Second Embodiment

Next, a second embodiment of the present invention will be described with reference to FIG. 12 to FIG. 15. Additionally, FIG. 1 is referred also in this embodiment with regard to the engine 1. In this embodiment, the exhaust gas switching valve 26 and the air-fuel ratio in each cylinder 2 (#1-#4) are controlled differently. Furthermore in the second embodiment, when ECU 30 determines that a prescribed fuel stop condition is fulfilled, it stops fuel supply to each cylinder 2 of at least any one of the first cylinder group and the second cylinder group, so that a so-called fuel-cut (F/C) treatment is executed. It is determined that a prescribed fuel stop condition is fulfilled, for example, when the engine 1 is in a speed-down operation and a rotation number of the engine 1 is equal to or larger than a preset prescribed rotation number. ECU 30 functions as a fuel supply stop device of the present invention by stopping fuel supply in this manner.

Figure 12:
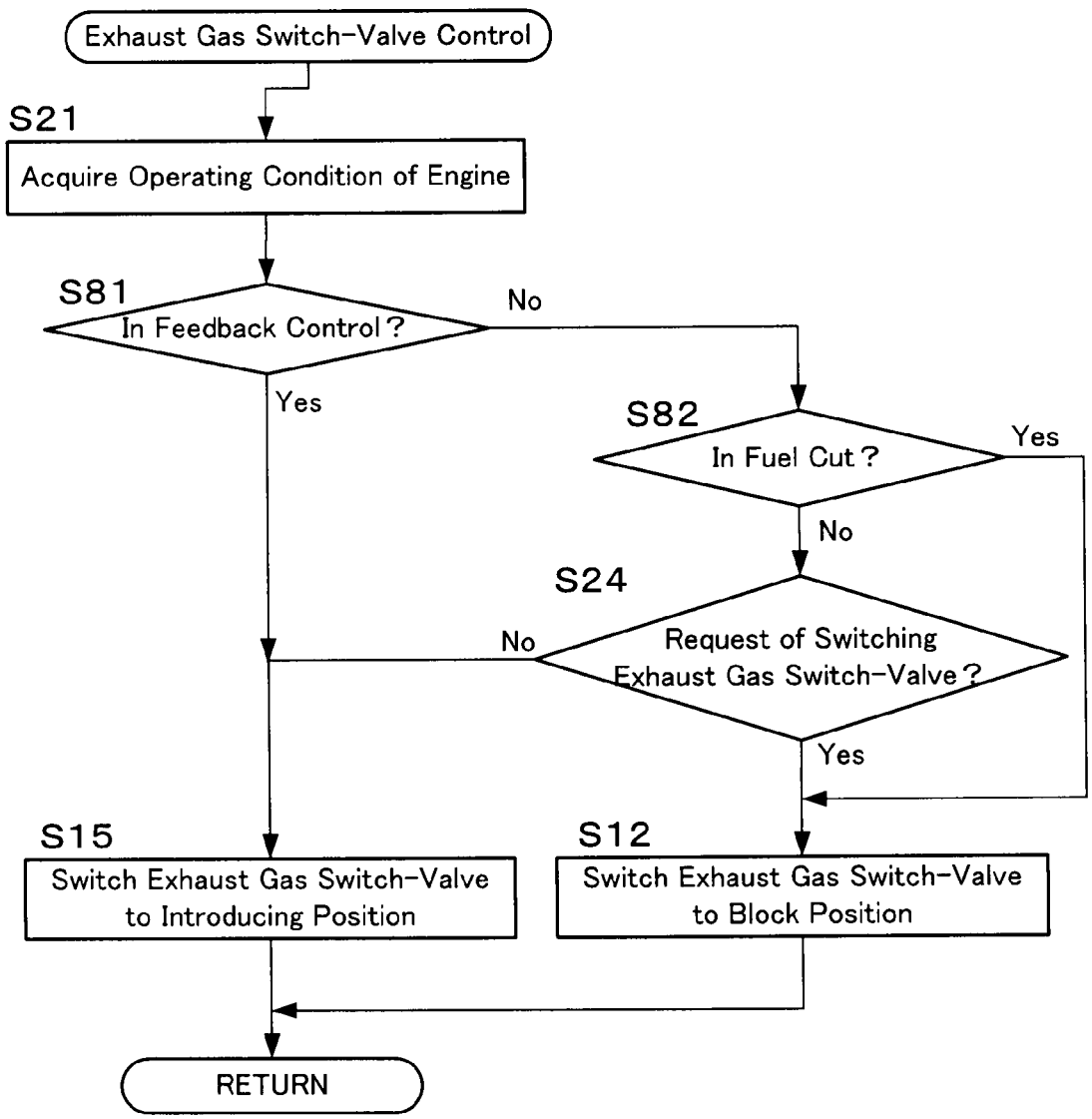
FIG. 12 is a flowchart showing an exhaust gas switching valve control routine executed by the ECU in a second embodiment.

FIG. 12 shows an exhaust gas switching valve control routine in the second embodiment. The control routine of FIG. 12 is executed repeatedly in a prescribed period during operation of the engine 1. Additionally, the same processes in FIG. 12 as those in FIG. 3 and FIG. 4 have the same reference numbers and their description will be simplified or omitted.

In the control routine of FIG. 12, first at step S21, ECU 30 acquires an operating condition of the engine 1. At the next step S81, ECU 30 determines whether or not a feed back control for the air-fuel ratio in each cylinder 2 (#1-#4) is in operation. The feedback control is the same control as that described in the first embodiment, and thus their description will be omitted. When ECU 30 determines that the feedback control is in operation, the process advances to step S15, and ECU 30 switches the exhaust gas switching valve 26 to the introducing position P1. Thereafter, ECU 30 ends the current control routine.

On the other hand, when ECU 30 determines that the feedback control is not in operation, the process advances to step S82, and ECU 30 determines whether or not a fuel-cut treatment for any of the cylinders 2 (#1-#4) is in operation. The determination may be made on the basis of whether or not the above prescribed fuel stop condition is fulfilled. When ECU 30 determines that the fuel-cut treatment is in operation, it skips step S24, and the process advances to step S12. On the other hand, when ECU 30 determines that the fuel-cut treatment is not in operation, the process advances to step S24, and ECU 30 determines whether or not a request of switching the exhaust gas switching valve 26 to the block position P2 is made in other routines executed by ECU 30. When ECU 30 determines that no request of switching is made, it executes the process at step S15 and thereafter ends the current control routine. On the other hand, when ECU 30 determines that a request of switching is made, the process advances to step S12, and ECU 30 switches the exhaust gas switching valve 26 to the block position P2. Thereafter, ECU 30 ends the current control routine.

In the control routine of FIG. 12, when a feedback control for the amount of fuel supply is in operation, ECU 30 switches the exhaust gas switching valve 26 to the introducing position P1. And thus, the main F/B control and the sub F/B control can be executed by using the first air-fuel ratio sensor 24 and the O2 sensor 15, respectively. Therefore, control accuracy for the air-fuel ratio in each cylinder 2 can be improved. Furthermore, when the fuel-cut treatment for any of the cylinders 2 (#1-#4) is in operation, ECU 30 switches the exhaust gas switching valve 26 to the block position P2. And thus, inflow of air in the starter catalyst 23 can be suppressed. Therefore, degradation of the starter catalyst 23 can be suppressed.

Figure 13:
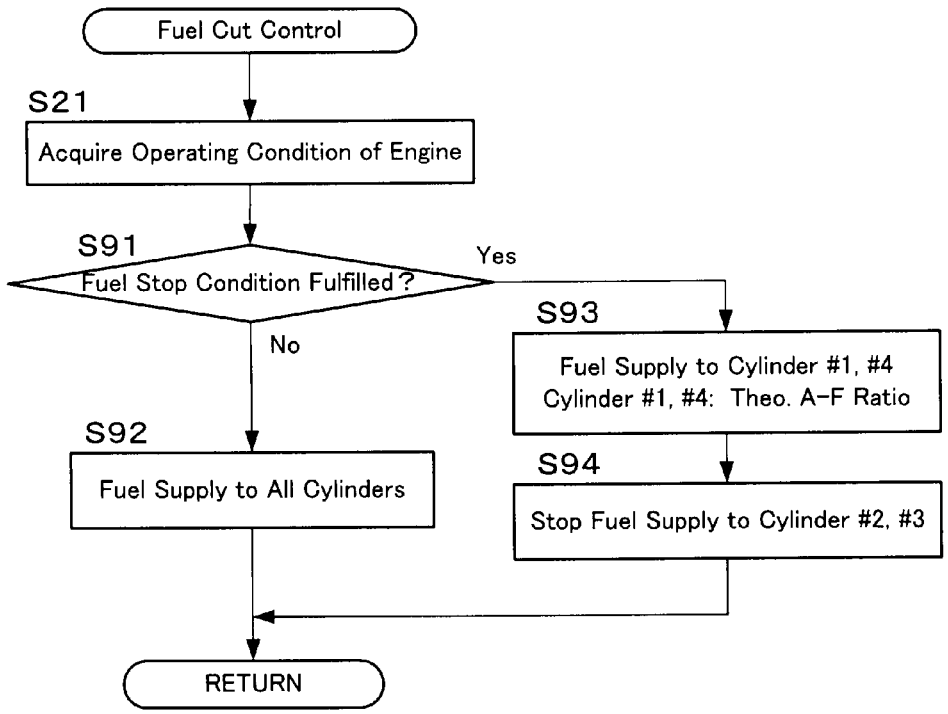
FIG. 13 is a flowchart showing a fuel-cut control routine executed by the ECU in the second embodiment.

FIG. 13 shows a fuel-cut control routine executed by ECU 30 repeatedly in a prescribed period during operation of the engine 1 in order that fuel-cut treatment should be executed when a prescribed fuel stop condition is fulfilled. Additionally, the same processes in FIG. 13 as those in FIG. 4 have same reference numbers and their description will be omitted. In the routine of FIG. 13, first at step S21, ECU 30 acquires an operating condition of the engine 1. At the subsequent step S91, ECU 30 determines whether or not a prescribed fuel stop condition is fulfilled. When ECU 30 determines that the prescribed fuel stop condition is not fulfilled, the process advances to step S92, and ECU 30 controls the operation of each injector 10 respectively in such a manner that a fuel supply amount of fuel is supplied to each cylinder 2 (#1-#4) respectively, wherein the fuel supply amount is set on the basis of the operating condition of the engine 1 and thereafter is corrected in the feedback control. Thereafter, ECU 30 ends the current control routine.

On the other hand, when ECU 30 determines that the prescribed fuel stop condition is fulfilled, the process advances to step S93, and ECU 30 sets a fuel supply amount of fuel supplied to each cylinder 2 in such a manner that the air-fuel ratio in each cylinder 2 (#1, #4) becomes at the theoretical air-fuel ratio, and controls the injector 10 corresponding to each cylinder 2 respectively in such a manner that the fuel supply amount of fuel is supplied to each cylinder 2 (#1, #4). At the subsequent step S94, ECU 30 prohibits the operation of the injector 10 corresponding to each cylinder 2 in such a manner that fuel supply to each cylinder 2 (#2, #3) is stopped. Thereafter, ECU 30 ends the current control routine.

In this case, only the fuel supply to the cylinder 2 (#2, #3) is stopped during the fuel-cut treatment, and thus inflow of air in the starter catalyst 23 can be further suppressed by switching the exhaust gas switching valve 26 to the block position P2 In the control routine of FIG. 12. Therefore, degradation of the starter catalyst 23 can be further suppressed. Additionally, by executing the control routine of FIG. 13 thereby to changing the air-fuel ratio in each cylinder 2 (#1, #4) to the theoretical air-fuel ratio at the time when a fuel stop condition is fulfilled, ECU 30 functions as an in-fuel-stop air-fuel ratio change device of the present invention.

Figure 14:
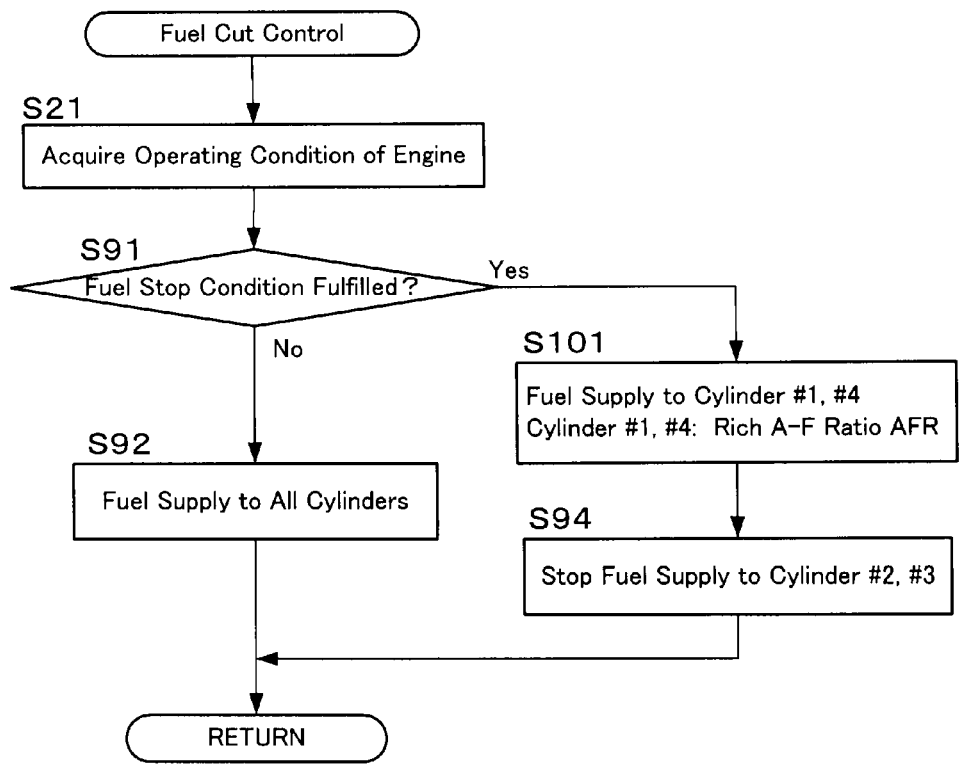
FIG. 14 is a flowchart showing a variation of the fuel-cut control routine.

FIG. 14 shows a variation of the fuel-cut control routine. In FIG. 14, step S101 is provided instead of step S93 in FIG. 13. At step S101, ECU 30 sets the amount of fuel supplied to each cylinder 2 in such a manner that the air-fuel ratio in each cylinder 2 (#1, #4) is at a rich air-fuel ratio AFR, which is on a richer side than the theoretical air-fuel ratio. And ECU 30 controls the injector 10 corresponding to each cylinder 2 respectively in such a manner that the amount of fuel is supplied to each cylinder 2 (#1, #4). Other parts are similar to those of FIG. 13, and thus their description will be omitted.

By controlling the air-fuel ratio in each cylinder 2 (#1, #4) at the rich air-fuel ratio AFR during the fuel-cut treatment in this manner, inflow of air in the starter catalyst 23 can be prevented more surely. Therefore, degradation of the starter catalyst 23 can be further suppressed.

Figure 15:
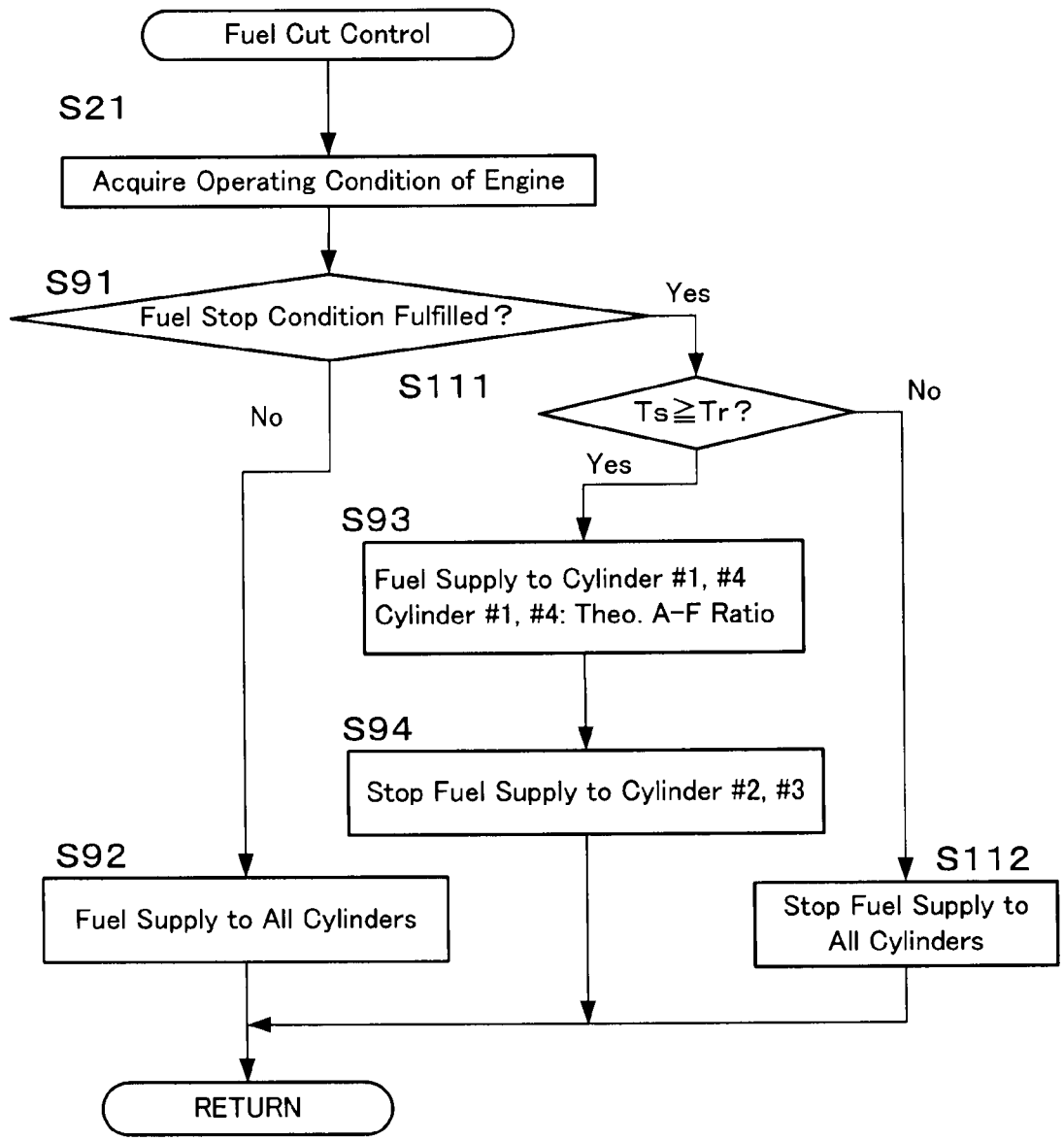
FIG. 15 is a flowchart showing another variation of the fuel-cut control routine.

FIG. 15 shows another variation of the fuel-cut control routine. Additionally, the same processes in FIG. 15 as those in FIG. 4 and FIG. 13 have same reference numbers, and their description will be omitted. In FIG. 15, ECU 30 processes in a similar manner to FIG. 13 up to step S91. When step S91 is determined negatively, ECU 30 ends the current control routine after the process at step S92 is executed. On the other hand, when step S91 is determined affirmatively, the process advances to step S111, and ECU 30 determines whether or not the temperature Ts of the starter catalyst 23 is at or higher than a preset prescribed degradation suppress judgment temperature Tr. The degradation suppress judgment temperature Tr is set in such a manner that the temperature Ts of the starter catalyst 23 can be maintained at or lower than the prescribed degrading temperature, for example, even when air flows in the starter catalyst 23 from each cylinder 2 (#1, #4).

When ECU 30 determines that the temperature Ts of the starter catalyst 23 is at or higher than the degradation suppress judgment temperature Tr, ECU 30 executes the processes at steps S93 and S94 and thereafter ends the current control routine. On the other hand, when ECU 30 determines that the temperature Ts of the starter catalyst 23 is lower than the degradation suppress judgment temperature Tr, the process advances to step S112, and ECU 30 prohibits the operation of each injector 10 in such a manner that fuel supply to all cylinders 2 (#1-#4) is stopped. Thereafter, ECU 30 ends the current control routine.

In the case that the temperature Ts of the starter catalyst 23 can be maintained at or lower than the degrading temperature, the amount of fuel consumed in the engine 1 can be reduced by stopping fuel supply to all cylinders 2 even when air flows in the starter catalyst 23 in this manner. Therefore, fuel consumption can be improved. By changing the number of cylinders in this manner in which fuel supply is stopped, ECU 30 functions as a number-of-supply-stopped-cylinders change device of the present invention.

Third Embodiment

A third embodiment of the present invention will be described with reference to FIG. 16 to FIG. 20. FIG. 1 is referred also in this embodiment with regard to the engine 1. However, in this embodiment, a NOx storage reduction type catalyst (it may be abbreviated as a NOx catalyst in the following.) is disposed as the main catalyst 11. The NOx catalyst may be a well known one, which stores NOx contained in exhaust gas in a leaner atmosphere than the theoretical air-fuel ratio, namely, in an oxidizing atmosphere with excess oxygen, and which releases the stored NOx and cleans the NOx by reduction in a richer atmosphere than the theoretical air-fuel ratio, namely, in a reducing atmosphere with excess fuel, or at the theoretical air-fuel ratio. Therefore, their detailed description will be omitted.

The NOx catalyst stores NOx in this manner when the air-fuel ratio of the exhaust gas is leaner than the theoretical air-fuel ratio. And thus, in the engine 1 of the third embodiment, ECU 30 determines whether or not a prescribed lean operating condition is fulfilled, where no inconvenience is caused even when the air-fuel ratio in each cylinder 2 (#1-#4) is controlled at a leaner air-fuel ratio than the theoretical air-fuel ratio, on the basis of the operating condition of the engine 1. When ECU 30 determines that the lean operating condition is fulfilled, ECU 30 controls the amount of fuel supplied to each cylinder 2 in such a manner that the air-fuel ratio in each cylinder 2 becomes leaner than the theoretical air-fuel ratio. This control may be referred as a normal control in the following. ECU 30 functions as an air-fuel ratio control device by controlling the air-fuel ratio in this manner.

When sulfur poisoning of the NOx catalyst is caused by sulfur oxide (SOx) in exhaust gas, exhaust gas cleaning performance gets degraded. Therefore, in order that exhaust gas cleaning performance in the NOx catalyst should be restored, the main catalyst 11 is heated up to a release temperature zone (ex. $\geqq 650°$ C.), where SOx is released from the NOx catalyst; and an S-regeneration treatment is executed periodically, in which the air-fuel ratio of exhaust gas in a vicinity of the NOx catalyst is set at or richer than the theoretical air-fuel ratio so that sulfur poisoning of NOx catalyst is resolved. Furthermore, a NOx reduction treatment in which NOx stored in NOx catalyst is released and reduced to Nitrogen gas is executed periodically for the NOx catalyst, by executing a rich spike treatment in which the air-fuel ratio of the exhaust gas in a vicinity of the NOx catalyst is set at or richer than the theoretical air-fuel ratio.

Figure 16:
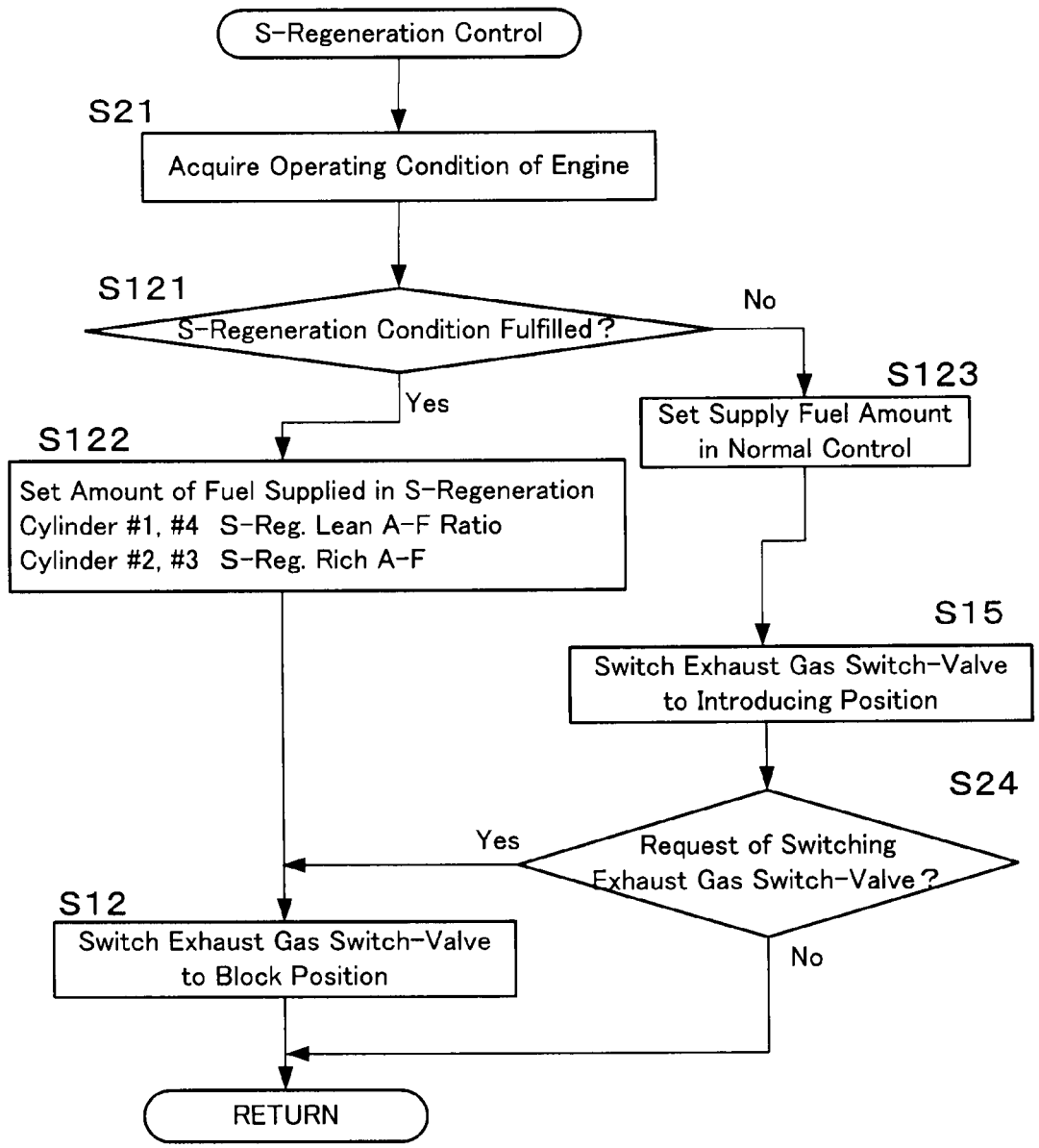
FIG. 16 is a flowchart showing an S-regeneration control routine executed by the ECU in a third embodiment.

FIG. 16 shows an S-regeneration control routine executed by ECU 30 in order that S-regeneration treatment in the NOx catalyst which serves as the main catalyst 11 should be executed periodically. The control routine of FIG. 16 is executed repeatedly in a prescribed period during operation of the engine 1. Additionally, the same processes in FIG. 16 as those in FIG. 3 and FIG. 4 have the same reference numbers and their description will be simplified or omitted.

In the control routine of FIG. 16, first at step S21, ECU 30 acquires an operating condition of the engine 1. At the subsequent step S121, ECU 30 determines whether or not a prescribed S-regeneration condition is fulfilled. It may be judged in a well known judging method whether or not the S-regeneration condition is fulfilled. For example, ECU 30 determines that the S-regeneration condition is fulfilled when a cumulative amount of used fuel after the execution of the S-regeneration treatment in a previous turn exceeds a preset judgment value. When ECU 30 determines that the S-regeneration condition is fulfilled, the process advances to step S122, and ECU 30 sets the amount of fuel to be supplied to each cylinder 2 in such a manner that the air-fuel ratio in each cylinder 2 (#1, #4) is controlled at an S-regeneration lean air-fuel ratio and the air-fuel ratio in each cylinder 2 (#2, #3) is controlled at an S-regeneration rich air-fuel ratio. Additionally, the S-regeneration rich air-fuel ratio is set in such a manner that the main catalyst 11 can be heated up to the above-mentioned release temperature zone through unburned fuel contained in the exhaust gas from each cylinder 2 (#2, #3) which is controlled at the S-regeneration lean air-fuel ratio. On the other hand, the S-regeneration lean air-fuel ratio is set in such a manner that, when exhaust gas from each cylinder 2 (#1, #4) controlled at the S-regeneration rich air-fuel ratio is mixed with the exhaust gas having the S-regeneration rich air-fuel ratio, the air-fuel ratio of the mixed exhaust gas becomes at or on a little richer side than the theoretical air-fuel ratio. By supplying the set amount of fuel supply to each cylinder 2 in this manner, S-regeneration treatment can be executed. At the next step S12, ECU 30 switches the exhaust gas switching valve 26 to the block position P2. Thereafter, ECU 30 ends the current control routine.

On the other hand, when ECU 30 determines that the S-regeneration condition is not fulfilled, the process advances to step S123, and ECU 30 sets the amount of fuel supplied to each cylinder 2 to the amount of fuel supplied in the normal control. At the subsequent step S15, ECU 30 switches the exhaust gas switching valve 26 to the introducing position P1. At the next step S24, ECU 30 determines whether or not a request of switching the exhaust gas switching valve 26 to the block position P2 is made in other routines executed by ECU 30. When ECU 30 determines that no request of switching the exhaust gas switching valve 26 to the block position P2 is made, ECU 30 ends the current control routine. On the other hand, when a request of switching the exhaust gas switching valve 26 to the block position P2 is made, ECU 30 executes the process at step S12 and thereafter ends the current control routine.

In the control routine of FIG. 16, the exhaust switch valve 26 is switched to the block position P2 during the S-regeneration treatment. And thus, consumption of unburned fuel in the starter catalyst 23 can be prevented. Therefore, the NOx catalyst 11 can be heated up promptly. Furthermore, by preventing inflow of exhaust gas having S-regeneration rich air-fuel ratio in the starter catalyst 23, increase of the temperature of the starter catalyst 23 can be suppressed. Therefore, overheat of the starter catalyst 23 can be prevented. Furthermore, inflow of unburned fuel in the starter catalyst 23 can be prevented. And thus, poisoning of the starter catalyst 23 by HC and CO can be suppressed.

Figure 17:
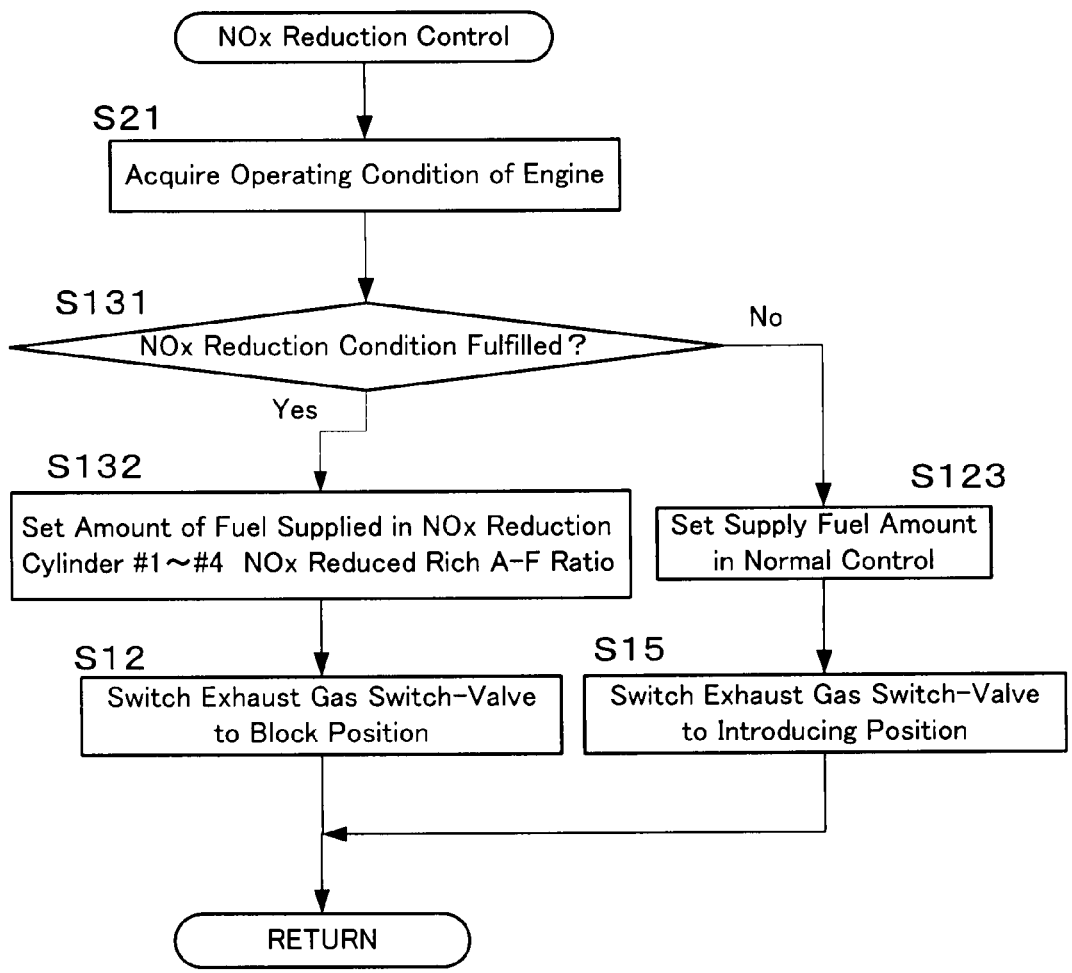
FIG. 17 is a flowchart showing a NOx reduction control routine executed by the ECU in the third embodiment.

FIG. 17 shows a NOx reduction control routine executed by ECU 30 in order that NOx reduction treatment of the NOx catalyst should be executed periodically. The control routine of FIG. 17 is executed repeatedly in a prescribed period during operation of the engine 1. Additionally, the same processes in FIG. 17 as those in FIG. 3, FIG. 4, and FIG. 16 have the same reference numbers and their description will be simplified or omitted.

In the control routine of FIG. 17, first at step S21, ECU 30 acquires an operating condition of the engine 1. At the next step S131, ECU 30 determines whether or not a prescribed NOx reduction condition is fulfilled. It may be judged in a well known judging method whether or not the NOx reduction condition is fulfilled. For example, it is determined that the NOx reduction condition is fulfilled when the amount of exhaust gas flowing into the main catalyst 11 exceeds a preset judgment amount after the NOx reduction treatment is executed. When ECU 30 determines that the NOx reduction condition is fulfilled, the process advances to step S132, and ECU 30 sets the amount of fuel supplied to each cylinder 2 in such a manner that the air-fuel ratio of exhaust gas emitted from all cylinders 2 (#1-#4) becomes a NOx reduction rich air-fuel ratio. The NOx reduction rich air-fuel ratio is set in such a manner that the air-fuel ratio of the exhaust gas in the main catalyst 11 becomes the air-fuel ratio beyond which NOx is released from NOx catalyst, namely at the theoretical air-fuel ratio, or at a richer air-fuel ratio than the theoretical air-fuel ratio. In this manner, a rich spike treatment is executed, and thus NOx reduction treatment of NOx catalyst is executed. At the subsequent step S12, ECU 30 switches the exhaust gas switching valve 26 to the block position P2. Thereafter, ECU 30 ends the current control routine.

On the other hand, when ECU 30 determines that the NOx reduction condition is not fulfilled, the process advances to step S123, and ECU 30 sets the amount of fuel supplied to each cylinder 2 at the amount of fuel supply in the normal control. At the subsequent step S15, ECU 30 switches the exhaust gas switching valve 26 to the introducing position P1 and thereafter ends the current control routine.

In the control routine of FIG. 17, the exhaust gas switching valve 26 is switched to the block position P2 during the NOx reduction treatment, and thus unburned fuel consumed in the starter catalyst 23 can be reduced. Therefore, the amount of fuel used for NOx reduction can be reduced, and fuel consumption in the engine 1 can be improved. Furthermore, in this way, the air-fuel ratio of exhaust gas in the main catalyst 11 can be regulated promptly at or on a richer side than the theoretical air-fuel ratio. And thus, the time required for NOx reduction treatment can be reduced.

Figure 18:
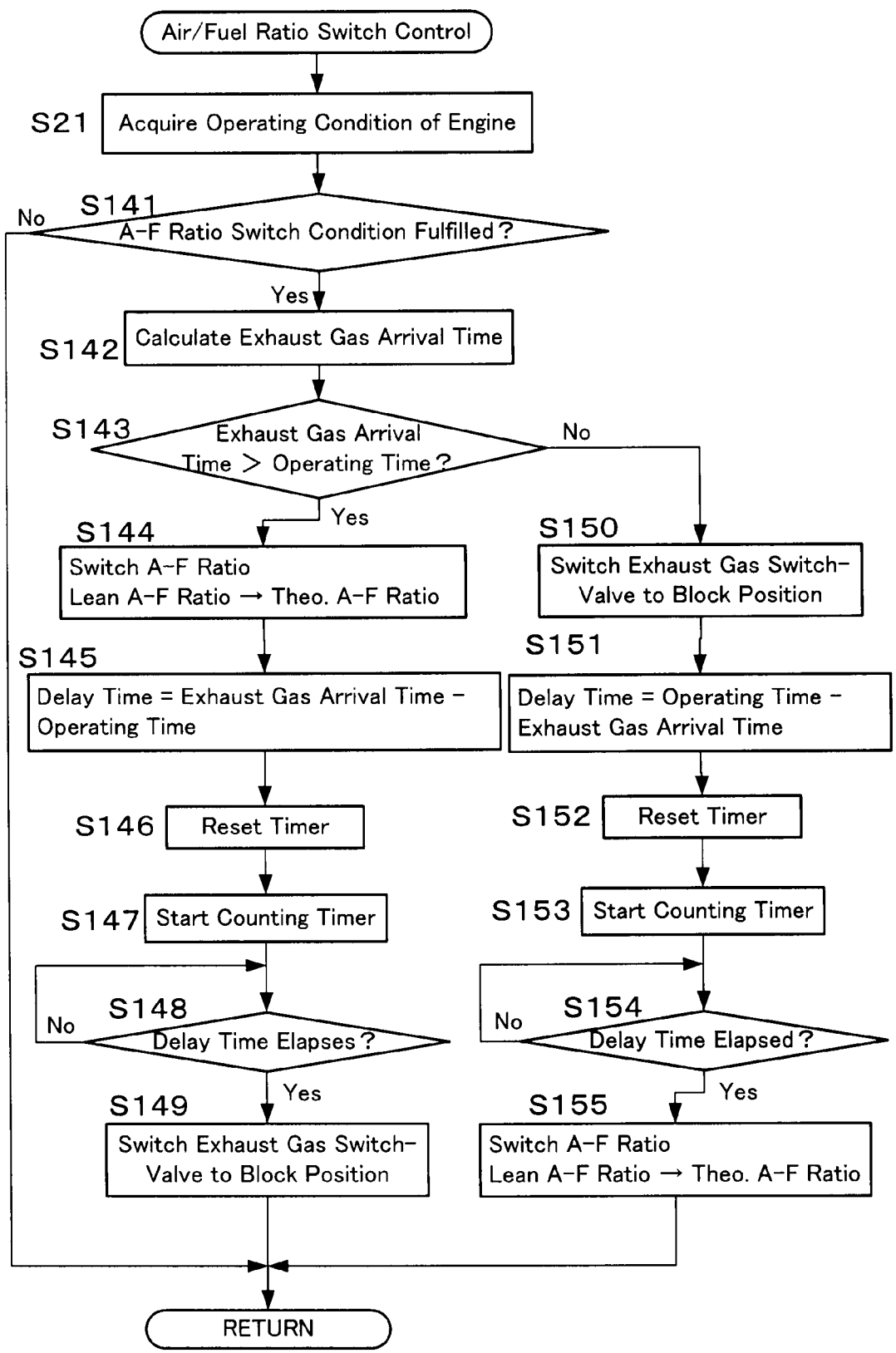
FIG. 18 is a flowchart showing an air-fuel ratio switching control routine executed by the ECU in the third embodiment.

In the engine 1 of the third embodiment, the air-fuel ratio in each cylinder 2 is normally controlled in such a manner that the air-fuel ratio becomes on a leaner side than the theoretical air-fuel ratio. However, the air-fuel ratio in each cylinder 2 is controlled at the theoretical air-fuel ratio in some operating conditions of the engine 1. FIG. 18 shows an air-fuel ratio switching control routine executed by ECU 30 in order that air-fuel ratio of exhaust gas should be switched in accordance with the operating condition of the engine 1 from an air-fuel ratio on a leaner side than the theoretical air-fuel ratio to the theoretical air-fuel ratio. The control routine of FIG. 18 is executed repeatedly in a prescribed period during operation of the engine 1. Additionally, the same processes in FIG. 18 as those in FIG. 4 have the same reference numbers and their description will be simplified or omitted.

In the control routine of FIG. 18, first at step S21, ECU 30 acquires an operating condition of the engine 1. At the subsequent step S141, ECU 30 determines whether or not a prescribed air-fuel ratio switch condition is fulfilled, where the air-fuel ratio in each cylinder 2 (#1-#4) is switched to the theoretical air-fuel ratio from an air-fuel ratio on a leaner side than the theoretical air-fuel ratio. It is determined that the air-fuel ratio switch condition is fulfilled, for example, when the temperature Tm of the main catalyst 11 is at or lower than the lower limit of a prescribed active temperature zone, where cleaning of exhaust gas is executed properly in the NOx catalyst. When ECU 30 determines that the air-fuel ratio switch condition is not fulfilled, it ends the current control routine.

On the other hand, when ECU 30 determines that the air-fuel ratio switch condition is fulfilled, the process advances to step S142, and ECU 30 calculates an exhaust gas arrival time. The exhaust gas arrival time is a time taken for exhaust gas having a post-switch air-fuel ratio to arrive at the exhaust gas switching valve 26 from the cylinder 2 in a case that the air-fuel ratio in each cylinder 2 (#2, #3) is switched from a lean air-fuel ratio to the theoretical air-fuel ratio. The exhaust gas arrival time is correlated with a rotation number and load of the engine 1. For example, the higher the rotation number of the engine 1, the shorter the exhaust gas arrival time becomes. Therefore, the relationship between a rotation number and load of the engine 1 and the exhaust gas arrival time are obtained in advance experimentally or the like, and is stored in the ROM of ECU 30 as a map. Calculation of the exhaust gas arrival time may be made with reference to the map.

At the subsequent step S143, ECU 30 determines whether or not the calculated exhaust gas arrival time is longer than an operating time of the exhaust gas switching valve 26. The operating time of the exhaust gas switching valve 26 is a time for which the exhaust gas switching valve 26 is switched from the introducing position P1 to the block position P2. When ECU 30 determines that the exhaust gas arrival time is longer than the operating time of the exhaust gas switching valve 26, the process advances to step S144, and ECU 30 switches the air-fuel ratio in each cylinder 2 (#1-#4) from a lean air-fuel ratio to the theoretical air-fuel ratio. At the subsequent step S145, ECU 30 sets a delay time, which is a time period from a switching of the air-fuel ratio in each cylinder 2 up to a switching of the exhaust gas switching valve 26, to a difference obtained by subtracting the operating time from the exhaust gas arrival time. Thereafter, ECU 30 resets a timer for counting the delay time at step S146, and starts counting the timer at step S147. At the next step S148, ECU 30 starts counting, and then determines whether or not the delay time set at step S145 has elapsed. When ECU 30 determines that the delay time has not elapsed, it repeats the process at step S148 until the delay time elapses. On the other hand, when ECU 30 determines that the delay time has elapsed, the process advances to step S149, and ECU 30 switches the exhaust gas switching valve 26 to the block position P2. Thereafter, ECU 30 ends the current control routine.

On the other hand, When ECU 30 determines that the exhaust gas arrival time is equal to or shorter than the operating time, the process advances to step S150, and ECU 30 switches the exhaust gas switching valve 26 to the block position P2. At the subsequent step S151, ECU 30 set a delay time, which is a time period from a switching of the exhaust gas switching valve 26 to the block position P2 up to a switching of the air-fuel ratio in each cylinder 2, to a difference obtained by subtracting the exhaust gas arrival time from the operating time. Thereafter, ECU 30 resets a timer for counting the delay time at step S152, and starts counting the timer at step S153. At the next step S154, ECU 30 determines whether or not the delay time set at step S151 has elapsed from the start of counting the timer. When ECU 30 determines that the delay time has not elapsed, it repeats the process at step S154 until the delay time elapses. On the other hand, when ECU 30 determines that the delay time has elapsed, the process advances to step S155, and ECU 30 switches the air-fuel ratio in each cylinder 2 (#1-#4) from a lean air-fuel ratio to the theoretical air-fuel ratio. Thereafter, ECU 30 ends the current control routine.

By switching the exhaust gas switching valve 26 to the block position P2 in this manner almost at the same timing as a timing at which exhaust gas having a lean air-fuel ratio and emitted from each cylinder 2 (#2, #3) arrives at the exhaust gas switching valve 26, inflow of exhaust gas having the theoretical air-fuel ratio and emitted from each cylinder 2 (#2, #3) in the starter catalyst 23 can be prevented. And thus, a mixed state of exhaust gas having the theoretical air-fuel ratio and exhaust gas having a lean air-fuel ratio can be prevented in the starter catalyst 23. Therefore, degradation of NOx cleaning performance in the starter catalyst 23 can be suppressed. Furthermore, since exhaust gas having a lean air-fuel ratio and emitted from each cylinder 2 (#2, #3) is guided to the starter catalyst 23, the exhaust gas can be cleaned in the starter catalyst 23. Therefore, quality of exhaust emission can be improved.

Figure 19:
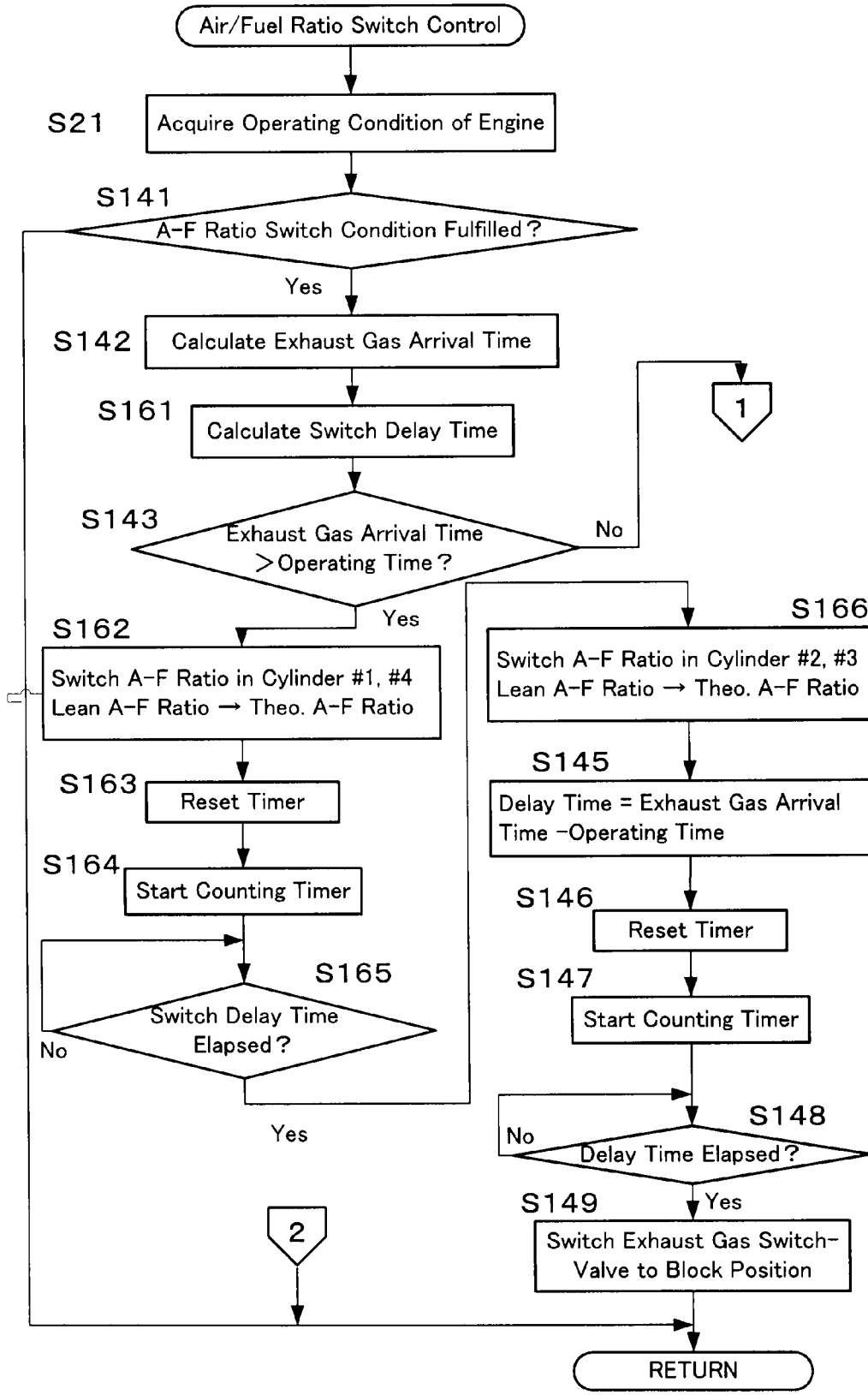
FIG. 19 is a flowchart showing a variation of the air-fuel ratio switching control routine.
Figure 20:
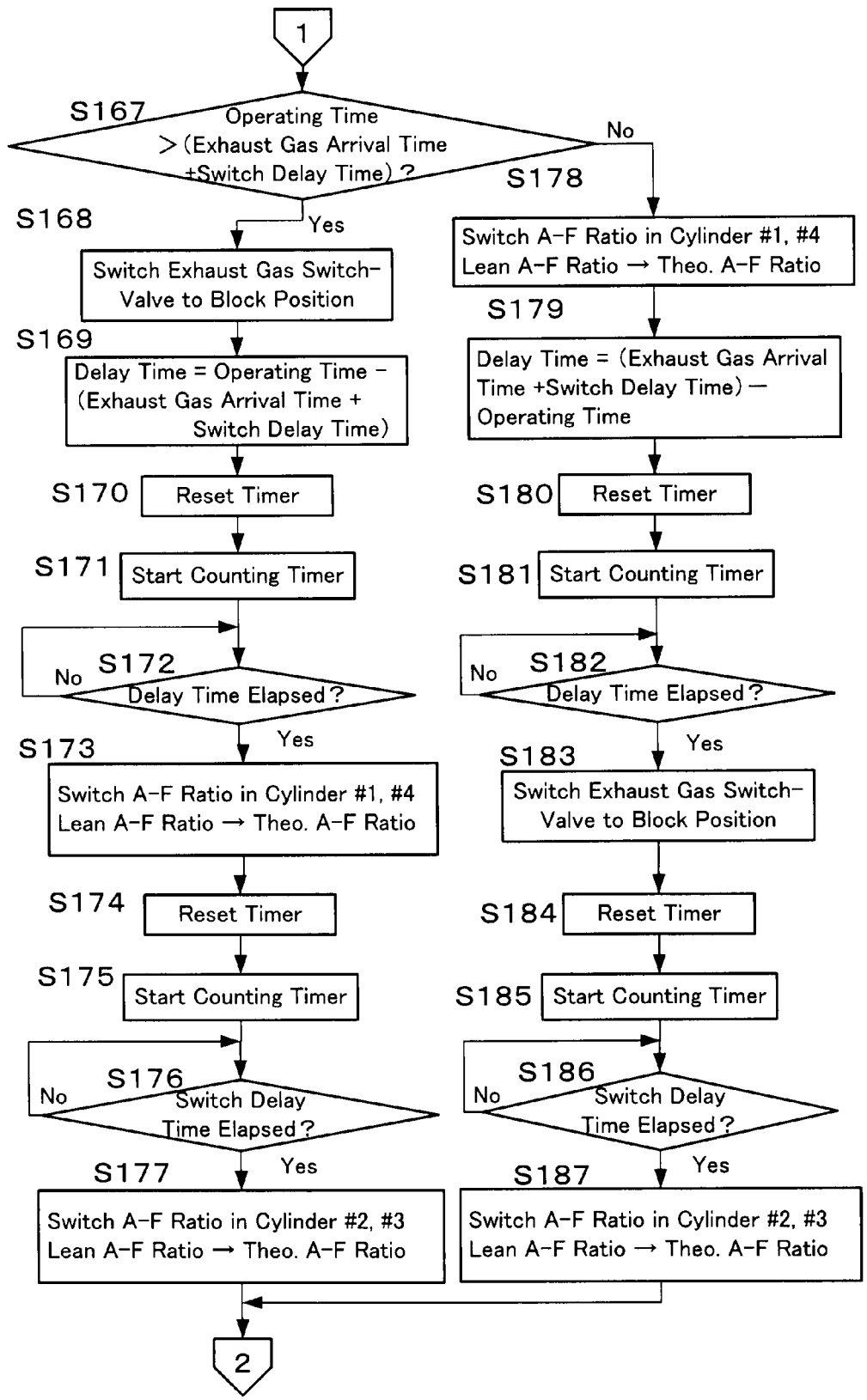
FIG. 20 is a subsequent flowchart of FIG. 19.

FIG. 19 and FIG. 20 show a variation of the air-fuel ratio control routine. Additionally, FIG. 20 is a subsequent flowchart of FIG. 19. Additionally, the same processes in FIG. 19 and FIG. 20 as those in FIG. 4 and FIG. 18 have same reference numbers, and their description will be simplified or omitted.

In the control routine of FIG. 19, ECU 30 processes in a similar manner to FIG. 18 up to the calculation of the exhaust gas arrival time (at step S142). After the calculation of the exhaust gas arrival time, ECU 30 calculates a switch delay time at step S161, which is a time from when the air-fuel ratio in each cylinder 2 (#1, #4) is switched up to a time when the air-fuel ratio in each cylinder 2 (#2, #3) is switched. When the exhaust gas switching valve 26 is at the block position P2, exhaust gas from each cylinder 2 (#1, #4) passes through the starter catalyst 23, and exhaust gas from each cylinder 2 (#2, #3) bypasses the starter catalyst 23. In this case, a time required for exhaust gas emitted from each cylinder 2 (#1, #4) to arrive at the main catalyst 11 becomes longer than a time required for exhaust gas emitted from each cylinder 2 (#2, #3) to arrive at the main catalyst 11. Therefore, when air-fuel ratios in each cylinder 2 (#1-#4) are switched at a time, a mixed state of exhaust gas having a lean air-fuel ratio and exhaust gas having the theoretical air-fuel ratio is generated in the main catalyst 11. The switch delay time is a time period set in order to avoid generation of such a state. A time difference between a time required for exhaust gas emitted from each cylinder 2 (#1, #4) to arrive at the main catalyst 11 and a time required for exhaust gas emitted from each cylinder 2 (#2, #3) to arrive at the main catalyst 11 is correlated with a rotation number and load of the engine 1. For example, the higher the rotation number of the engine 1, the lesser the time difference becomes. Therefore, the relationship between a rotation number and load of the engine 1 and the switch delay time are obtained in advance experimentally or the like and are stored in the ROM of ECU 30 as a map. The calculation of the switch delay time may be made with reference to the map.

At the next step S143, ECU 30 determines whether or not the exhaust gas arrival time is longer than the operating time. When ECU 30 determines that the exhaust gas arrival time is longer than the operating time, the process advances to step S162, and ECU 30 switches the air-fuel ratio in each cylinder 2 (#1, #4) from a lean air-fuel ratio to the theoretical air-fuel ratio. Thereafter at step S163, ECU 30 resets a timer for counting the switch delay time, and starts counting the timer at step S164. At the next step S165, ECU 30 determines whether or not the switch delay time elapses from the start of counting the timer. When ECU 30 determines that the switch delay time has not elapsed, ECU 30 repeats the process at step S165 until the switch delay time elapses. On the other hand, when the switch delay time has elapsed, the process advances to step S166, and ECU 30 switches the air-fuel ratio in each cylinder 2 (#2, #3) from a lean air-fuel ratio to the theoretical air-fuel ratio. ECU 30 processes in a similar manner to FIG. 18 from the next step S145 up to step S149. Thereafter, ECU 30 ends the current control routine.

When ECU 30 determines that the exhaust gas arrival time is equal to or shorter than the operating time, the process advances to step S167 in FIG. 20, and ECU 30 determines whether or not the operating time is longer than a sum obtained by adding the exhaust gas arrival time and the switch delay time. When ECU 30 determines that the operating time is longer than the sum of the exhaust gas arrival time and the switch delay time, the process advances to step S168, and ECU 30 switches the exhaust gas switching valve 26 to the block position P2. At the subsequent step S169, ECU 30 sets a delay time to a difference obtained by subtracting both the exhaust gas arrival time and the switch delay time from the operating time. Thereafter, ECU 30 resets a timer for counting the delay time at step S170, and starts counting the timer at step S171. At the next step S172, ECU 30 determines whether or not the delay time set at step S169 has elapsed from the start of counting the timer. When ECU 30 determines that the delay time does not elapse, ECU 30 repeats the process at step S172 until the delay time elapses. On the other hand, when ECU 30 determines that the delay time has elapsed, the process advances to step S173, and ECU 30 switches the air-fuel ratio in each cylinder 2 (#1, #4) from a lean air-fuel ratio to the theoretical air-fuel ratio. Thereafter at step S174, ECU 30 resets a timer for counting the switch delay time, and starts counting the timer at step S175. At the next step S176, ECU 30 determines whether or not the switch delay time has elapsed from the start of counting the timer. When ECU 30 determines that the switch delay time has not elapsed, it repeats the process at step S176 until the switch delay time elapses. On the other hand, when ECU 30 determines that the switch delay time has elapsed, the process advances to step S177, and ECU 30 switches the air-fuel ratio in each cylinder 2 (#2, #3) from a lean air-fuel ratio to the theoretical air-fuel ratio. Thereafter, ECU 30 ends the current control routine.

On the other hand, when ECU 30 determines that the operating time is equal to or shorter than the sum of the exhaust gas arrival time and the switch delay time, the process advances to step S178, and ECU 30 switches the air-fuel ratio in each cylinder 2 (#1, #4) from a lean air-fuel ratio to the theoretical air-fuel ratio. At the subsequent step S179, ECU 30 sets the delay time to a difference obtained by subtracting the operating time from the sum of the exhaust gas arrival time and the switch delay time. Thereafter at step S180, ECU 30 resets the timer for counting the delay time, and starts counting the timer at step S181. At the next step S182, ECU 30 determines whether or not the delay time set at step S179 has elapsed from the start of counting the timer. When ECU 30 determines that the delay time has not elapsed, ECU 30 repeats the process at step S182 until the delay time elapses. On the other hand, when ECU 30 determines that the delay time has elapsed, the process advances to step S183, and ECU 30 switches the exhaust gas switching valve 26 to the block position P2. Thereafter at step S184, ECU 30 resets the timer for counting the switch delay time, and starts counting the timer at step S185. At the next step S186, ECU 30 determines whether or not the switch delay time has elapsed from the start of counting the timer. When ECU 30 determines that the switch delay time has not elapsed, ECU 30 repeats the process at step S186 until the switch delay time elapses. On the other hand, when ECU 30 determines that the switch delay time has elapsed, the process advances to step S187, and ECU 30 switches the air-fuel ratio in each cylinder 2 (#2, #3) from a lean air-fuel ratio to the theoretical air-fuel ratio. Thereafter, ECU 30 ends the current control routine.

In this variation, a mixed state of exhaust gas having a lean air-fuel ratio and exhaust gas having the theoretical air-fuel ratio in the main catalyst 11 can be prevented. Accordingly, degradation of NOx cleaning performance in the main catalyst 11 can be suppressed, and thus quality of exhaust emission can be improved.

The present invention is not limited to the above embodiments and may be embodied in various forms. For example, the internal combustion engine to which the present invention is applied is not limited to so-called port injection type internal combustion engines, in which fuel is injected into the intake passage. The present invention may be applied to direct injection internal combustion engines, in which fuel is injected directly into cylinders. Moreover, the present invention is not limited to spark ignition internal combustion engines, and may be applied to diesel internal combustion engines. The number of cylinders which an internal combustion engine has is not limited to four, and their arrangement is not limited to a series type. The present invention may be applied to a V-type internal combustion engine. Furthermore, the present invention may be applied to various internal combustion engines having a number of cylinders, from which two groups of cylinders can be configured.

As described above, according to the exhaust gas control apparatus of the present invention, exhaust gas from cylinders of the first cylinder group and exhaust gas from cylinders of the second cylinder group can be guided to the turbine through separate branch passages by switching the valve switch device to the block position. And thus, turbocharging performance of the internal combustion engine can be improved by making use of exhaust pulsation. Furthermore, regardless of a position of the valve switch device, exhaust gas emitted from cylinders of the first cylinder group always passes through the exhaust gas cleaning catalyst, and thus exhaust gas can be cleaned prior to be guided to the turbine. Accordingly, exhaust gas guided to the turbine can be cleaned and turbocharging performance can be improved.

The invention claimed is:

1. An exhaust gas control apparatus for an internal combustion engine, which is applied to an internal combustion engine having a plurality of cylinders and a turbo charger, wherein the internal combustion engine is a spark ignition internal combustion engine, an exhaust passage of the internal combustion engine includes a first branch passage and a second branch passage, the first branch passage connects exhaust sides of cylinders of a first cylinder group composed of a first part of the plurality of cylinders and a turbine of the turbo charger, and is provided with an exhaust gas cleaning catalyst, and the second branch passage connects exhaust sides of cylinders of a second cylinder group composed of a second part of the plurality of cylinders and the turbine, the second branch passage being in communication with the first branch passage upstream of the exhaust gas cleaning catalyst, the exhaust gas control apparatus comprising:

a valve switch device, which is an exhaust gas switching valve, disposed at a communication part through which the first branch passage and the second branch passage are in communication, the valve switch device being switchable between an introducing position, at which exhaust gas is introduced into the exhaust gas cleaning catalyst from cylinders of the second cylinder group, and a block position, at which introduction of the exhaust gas is blocked;

an air-fuel ratio detecting device, which is an air-fuel ratio sensor, disposed between the communication part and the exhaust gas cleaning catalyst in the first branch passage, the air-fuel ratio detecting device detecting an air-fuel ratio of the exhaust gas;

an electronic control unit (ECU) programmed to execute control of the exhaust gas control apparatus, the ECU including valve control programming instructions, which when executed, switch a position of the valve switch device based on an operating condition of the internal combustion engine, ignition timing control programming instructions, which when executed, retard an ignition timing for cylinders of the second cylinder group more than an ignition timing for cylinders of the first cylinder group when the valve switch device is switched to the block position, and feedback correcting programming instructions, which when executed, set an amount of feedback correction in accordance with a difference between the air-fuel ratio detected by the air-fuel ratio detecting device and a target air-fuel ratio, and correct an amount of fuel to be supplied to each cylinder, respectively, in a feedback manner in accordance with the amount of feedback correction, wherein in a case that the feedback correcting programming instructions are executed to correct the amount of fuel to be supplied to each cylinder in a feedback manner, the valve control programming instructions are executed to switch the valve switch device to the introducing position.

2. The exhaust gas control apparatus for an internal combustion engine according to claim 1, wherein when the valve switch device is switched to the block position, the feedback correcting programming instructions are executed to set the amount of feedback correction based on an air-fuel ratio of exhaust gas emitted from cylinders of the first cylinder group, and to correct the amount of fuel supplied to cylinders of the second cylinder group in accordance with the amount of feedback correction in a feedback manner.

3. The exhaust gas control apparatus for an internal combustion engine according to claim 1, wherein the valve control programming instructions are executed to switch the valve switch device to the block position during acceleration of the internal combustion engine.

4. The exhaust gas control apparatus for an internal combustion engine according to claim 1, further comprising:

a rear-stage exhaust gas cleaning catalyst which is disposed downstream of the turbine in the exhaust passage, and exhibits cleaning performance in a prescribed active temperature zone, wherein the valve control programming instructions are executed to switch the valve switch device to the introducing position, when a temperature of the rear-stage exhaust gas cleaning catalyst is lower than a prescribed temperature, which is a lower limit of the prescribed active temperature zone, or when a temperature of cooling water of the internal combustion engine is lower than a prescribed water temperature set in view of the lower limit of the prescribed active temperature zone.

5. The exhaust gas control apparatus for an internal combustion engine according to claim 1, wherein the ECU further includes air-fuel ratio control programming instructions, which when executed, change air-fuel ratios in the plurality of cylinders, respectively, and change the air-fuel ratio in each cylinder of the internal combustion engine, respectively, to a leaner side than a theoretical air-fuel ratio when a prescribed lean operating condition is fulfilled, wherein when the prescribed lean operating condition is fulfilled, the valve control programming instructions are executed to switch the valve switch device to the introducing position.

6. The exhaust gas control apparatus for an internal combustion engine according to claim 5, further comprising:

a NOx storage reduction type catalyst disposed downstream of the turbine in the exhaust passage, wherein when an S-poisoning restore treatment is executed, where the NOx catalyst is heated up to a target temperature zone such that sulfur oxide is released from the NOx catalyst, the valve control programming instructions are executed to switch the valve switch device to the block position, and the air-fuel ratio control programming instructions are executed to change the air-fuel ratios in cylinders of the first cylinder group to a leaner side than a theoretical air-fuel ratio, and change the air-fuel ratios in cylinders of the second cylinder group to a richer side than a theoretical air-fuel ratio.

7. The exhaust gas control apparatus for an internal combustion engine according to claim 5, further comprising:
a NOx storage reduction type catalyst which is disposed downstream of the turbine in the exhaust passage,
wherein the air-fuel ratio control programming instructions execute a rich spike treatment, where the air-fuel ratios in the plurality of cylinders are changed to a richer side than a theoretical air-fuel ratio, such that nitric oxide stored in the NOx catalyst is reduced by changing the air-fuel ratio of exhaust gas in the NOx catalyst to a richer side than a theoretical air-fuel ratio, and
wherein when the rich spike treatment is in operation, the valve control programming instructions are executed to switch the valve switch device to the block position.

8. The exhaust gas control apparatus for an internal combustion engine according to claim 5, further comprising:
a rear-stage exhaust gas cleaning catalyst which is disposed downstream of the turbine in the exhaust passage, and exhibits cleaning performance in a prescribed active temperature zone,
wherein when a temperature of the rear-stage exhaust gas cleaning catalyst is at or lower than a lower limit of the prescribed active temperature zone, the valve control programming instructions are executed to switch the valve switch device to the block position and prohibits a lean control, where the air-fuel ratio control programming instructions are executed to change the air-fuel ratios in the plurality of cylinders to a leaner side than the theoretical air-fuel ratio, and
wherein when the temperature of the rear-stage exhaust gas cleaning catalyst is higher than the lower limit of the prescribed active temperature zone, the valve control programming instructions are executed to switch the valve switch device to the introducing position and allows the lean control executed by the air-fuel ratio control programming instructions.

9. The exhaust gas control apparatus for an internal combustion engine according to claim 8, wherein when changing the air-fuel ratio in each cylinder of the internal combustion engine, the air-fuel ratio control programming instructions set a time difference between a change timing of air-fuel ratios in cylinders of the first cylinder group and a change timing of air-fuel ratios in cylinders of the second cylinder group in view of a difference between a time taken for exhaust gas emitted from cylinders of the first cylinder group to arrive at the communication part and a time taken for exhaust gas emitted from cylinders of the second cylinder group to arrive at the communication part and an operating time of the valve switch device, respectively.

10. The exhaust gas control apparatus for an internal combustion engine according to claim 9,
wherein when the air-fuel ratio in each cylinder of the internal combustion engine is changed from a leaner air-fuel ratio than a theoretical air-fuel ratio to a theoretical air-fuel ratio, the valve control programming instructions are executed to switch the valve switch device to the block position, and
wherein when the air-fuel ratio in each cylinder of the internal combustion engine is to be changed from a leaner air-fuel ratio than a theoretical air-fuel ratio to a theoretical air-fuel ratio, the air-fuel ratio control programming instructions are executed to retard the change timing of air-fuel ratios in cylinders of the second cylinder group later than the change timing of air-fuel ratios in cylinders of the first cylinder group.

11. The exhaust gas control apparatus for an internal combustion engine according to claim 1, further comprising a catalyst temperature acquiring device which acquires a temperature of the exhaust gas cleaning catalyst,
wherein either the ECU functions as the catalyst temperature acquiring device via temperature acquiring programming instructions or the catalyst temperature acquiring device is a temperature sensor,
wherein when a temperature acquired by the catalyst temperature acquiring device is at or higher than a prescribed overheat judgment temperature, the valve control programming instructions are executed to switch the valve switch device to the block position, and
wherein the prescribed overheat judgment temperature is set in view of a temperature beyond which the exhaust gas cleaning catalyst gets degraded.

12. The exhaust gas control apparatus for an internal combustion engine according to claim 11, further comprising a catalyst temperature increase suppressing device, which changes air-fuel ratios in cylinders of the first cylinder group to a richer side than a theoretical air-fuel ratio and changes air-fuel ratios in cylinders of the second cylinder group to a theoretical air-fuel ratio, when the valve switch device is at the block position and a temperature acquired by the catalyst temperature acquiring device is at or higher than the prescribed overheat judgment temperature,
wherein the ECU functions as the catalyst temperature increase suppressing device via temperature increase suppressing programming instructions.

13. The exhaust gas control apparatus for an internal combustion engine according to claim 11, wherein the ECU further includes air-fuel ratio changing-to-richer-side programming instructions, which when executed, change air-fuel ratios in cylinders of the first cylinder group to a first air-fuel ratio on a richer side than a theoretical air-fuel ratio and change air-fuel ratios in cylinders of the second cylinder group to a second air-fuel ratio which is on a richer side than a theoretical air-fuel ratio and on a leaner side than the first air-fuel ratio, when the valve switch device is at the block position and a temperature of the exhaust gas emitted from each cylinder of the internal combustion engine is higher than the prescribed overheat judgment temperature and is at or higher than a prescribed allowable upper limit temperature, which is set in view of heat resistance of exhaust components disposed in the exhaust passage of the internal combustion engine.

14. The exhaust gas control apparatus for an internal combustion engine according to claim 1, wherein the ECU further includes fuel supply stop programming instructions, which when executed, stop fuel supply to cylinders of any one of the first cylinder group and the second cylinder group, when a prescribed fuel stop condition is fulfilled,
wherein when fuel supply to any cylinder of the plurality of cylinders is stopped by the fuel supply stop programming instructions, the valve control programming instructions are executed to switch the valve switch device to the block position.

15. The exhaust gas control apparatus for an internal combustion engine according to claim 14, wherein when a prescribed fuel stop condition is fulfilled, the fuel supply stop device stops programming instructions are executed to stop fuel supply to cylinders of the second cylinder group, and
wherein the ECU further includes in-fuel-stop air-fuel ratio change programming instructions which, when the prescribed fuel stop condition is fulfilled, are executed to change air-fuel ratios in cylinders of the first cylinder group to a theoretical air-fuel ratio or an air-fuel ratio on a richer side than a theoretical air-fuel ratio.

16. The exhaust gas control apparatus for an internal combustion engine according to claim 14, wherein the fuel supply stop programming instructions include number-of-supply-stopped-cylinders change programming instructions, which when executed stop fuel supply to cylinders of the second cylinder group, and change air-fuel ratios in cylinders of the first cylinder group to a theoretical air-fuel ratio or an air-fuel ratio on a richer side than a theoretical air-fuel ratio, when the prescribed fuel stop condition is fulfilled and a temperature of the exhaust gas cleaning catalyst is at or higher than a prescribed degradation suppress judgment temperature set in view of a temperature beyond which the exhaust gas cleaning catalyst gets degraded, and which stop fuel supply to the plurality of cylinders, respectively, when the prescribed fuel stop condition is fulfilled and a temperature of the exhaust gas cleaning catalyst is lower than the prescribed degradation suppress judgment temperature.

* * * * *